(12) United States Patent
Kim et al.

(10) Patent No.: US 11,115,173 B2
(45) Date of Patent: Sep. 7, 2021

(54) METHOD AND APPARATUS FOR TRANSMITTING DEMODULATION REFERENCE SIGNAL

(71) Applicant: LG Electronics Inc., Seoul (KR)

(72) Inventors: Eunsun Kim, Seoul (KR); Kijun Kim, Seoul (KR); Yunjung Yi, Seoul (KR); Joonkui Ahn, Seoul (KR); Byounghoon Kim, Seoul (KR); Hyunsoo Ko, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/782,806

(22) Filed: Feb. 5, 2020

(65) Prior Publication Data

US 2020/0177356 A1 Jun. 4, 2020

Related U.S. Application Data

(63) Continuation of application No. 16/065,769, filed as application No. PCT/KR2017/006832 on Jun. 28, 2017, now Pat. No. 10,574,425.

(60) Provisional application No. 62/355,347, filed on Jun. 28, 2016.

(51) Int. Cl.
*H04L 5/00* (2006.01)
*H04L 27/26* (2006.01)

(52) U.S. Cl.
CPC .......... *H04L 5/0094* (2013.01); *H04L 5/0048* (2013.01); *H04L 5/0051* (2013.01); *H04L 27/2613* (2013.01); *H04L 5/0007* (2013.01); *H04L 5/0044* (2013.01)

(58) Field of Classification Search
CPC . H04L 27/2613; H04L 5/0007; H04L 5/0044; H04L 5/0048; H04L 5/0051; H04L 5/0094; H04L 25/0226; H04J 13/00; H04J 13/0055
See application file for complete search history.

(56) References Cited

U.S. PATENT DOCUMENTS

| 10,009,149 B2 | 6/2018 | Fong |
| 2007/0133462 A1 | 6/2007 | Guey |
| 2009/0285173 A1 | 11/2009 | Koorapaty |
| 2010/0329384 A1 | 12/2010 | Kwak |

(Continued)

FOREIGN PATENT DOCUMENTS

| WO | WO2011040797 | 4/2011 |
| WO | WO2016048027 | 3/2016 |
| WO | WO2016048055 | 3/2016 |

OTHER PUBLICATIONS

Ericsson, "Construction of DMRS sequences," 3GPP TSG RAN WG1 Meeting #85, May 23-27, 2016.

(Continued)

*Primary Examiner* — Jenee Holland
(74) *Attorney, Agent, or Firm* — Fish & Richardson P.C.

(57) ABSTRACT

In the present invention, a part of a first demodulation reference signal sequence generated on the basis of a basic subcarrier interval (hereinafter, a first subcarrier interval) is used for a second subcarrier interval which is K times the first subcarrier interval. Values selected one for every K from among values constituting the first demodulation reference signal sequence may be used as values constituting a second demodulation reference signal sequence for the second subcarrier interval.

20 Claims, 24 Drawing Sheets

(56) References Cited

U.S. PATENT DOCUMENTS

| | | | |
|---|---|---|---|
| 2011/0128909 A1* | 6/2011 | Luo | H04L 5/0023 370/328 |
| 2011/0143773 A1 | 6/2011 | Kangas | |
| 2011/0317785 A1 | 12/2011 | Petrov | |
| 2012/0051458 A1 | 3/2012 | Lee | |
| 2013/0022087 A1* | 1/2013 | Chen | H04L 27/2613 375/147 |
| 2013/0182692 A1* | 7/2013 | Dai | H04L 1/0028 370/336 |
| 2014/0022981 A1* | 1/2014 | Kim | H04L 5/0094 370/315 |
| 2014/0198747 A1 | 7/2014 | Ouchi | |
| 2014/0313994 A1* | 10/2014 | Su | H04L 1/0041 370/329 |
| 2014/0321421 A1* | 10/2014 | Popovic | H04L 5/0048 370/330 |
| 2014/0355709 A1* | 12/2014 | Liu | H04L 25/0226 375/267 |
| 2015/0009847 A1* | 1/2015 | Iwai | H04J 13/22 370/252 |
| 2015/0282178 A1* | 10/2015 | Kim | H04B 7/2656 370/329 |
| 2016/0112994 A1* | 4/2016 | Wang | H04W 72/042 370/329 |
| 2016/0352551 A1 | 12/2016 | Zhang | |
| 2016/0360518 A1 | 12/2016 | Noh | |
| 2017/0070994 A1 | 3/2017 | Rico Alvarino | |
| 2017/0201968 A1* | 7/2017 | Nam | H04L 5/0048 |
| 2017/0290008 A1* | 10/2017 | Tooher | H04L 1/0007 |
| 2017/0331577 A1* | 11/2017 | Parkvall | H04W 8/18 |
| 2018/0092002 A1* | 3/2018 | Manolakos | H04W 72/12 |

OTHER PUBLICATIONS

Huawei, "Discussion on DL DMRS for short TTI," 3GPP TSG RAN WG1 Meeting #84bis, Apr. 11-15, 2016.

PCT International Search Report in Application No. PCT/KR2017/006832 dated Oct. 26, 2017, 9 pages.

* cited by examiner (a)

(b)

(a)

(b)

(c)

(a)

(b)

(c)

METHOD AND APPARATUS FOR TRANSMITTING DEMODULATION REFERENCE SIGNAL

CROSS-REFERENCE TO RELATED APPLICATIONS

This application is a continuation of U.S. application Ser. No. 16/065,769, filed on Jun. 22, 2018, now allowed, which is a National Stage application under 35 U.S.C. § 371 of International Application No. PCT/KR2017/006832, filed on Jun. 28, 2017, which claims the benefit of U.S. Provisional Application No. 62/355,347, filed on Jun. 28, 2016. The disclosures of the prior applications are incorporated by reference in their entirety.

TECHNICAL FIELD

The present invention relates to a wireless communication system, and more particularly, to a method and apparatus for receiving/transmitting a downlink signal.

BACKGROUND

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

SUMMARY

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

In the present invention, a part of a first demodulation reference signal (DMRS) sequence generated based on a base subcarrier spacing (hereinafter, referred to as a first subcarrier spacing) is used for a second subcarrier spacing K times larger than the first subcarrier spacing. Values each selected every K values of the values of the first DMRS sequence may be used as the values of a second DMRS sequence for the second subcarrier spacing.

In an aspect of the present invention, a method of receiving a downlink signal by a user equipment (UE) in a wireless communication system is provided. The method comprises: receiving downlink data and a DMRS for the downlink data in a time slot on a frequency band allocated to the UE in a system bandwidth; and demodulating the downlink data based on the DMRS. The frequency band may have a subcarrier spacing of $K*f_{sc}$ in the time slot, where $f_{sc}$ is a base subcarrier spacing and K is a positive integer. The DMRS may be a part of a sequence subset in a DMRS sequence. The DMRS sequence is based on the base subcarrier spacing and the system bandwidth, and the part corresponds to the frequency band in the subset. The sequence subset may use one every K values of the DMRS sequence.

In another aspect of the present invention, a UE for receiving a downlink signal in a wireless communication system is provided. The UE includes a radio frequency (RF)

unit; and a processor configured to control the RF unit. The processor may be configured to control the RF unit to receive downlink data and a demodulation reference signal (DMRS) for the downlink data in a time slot on a frequency band allocated to the UE in a system bandwidth, and demodulate the downlink data based on the DMRS. The frequency band may have a subcarrier spacing of $K*f_{sc}$ in the time slot, where $f_{sc}$ is a base subcarrier spacing and K is a positive integer. The DMRS may be a part of a sequence subset in a DMRS sequence. The DMRS sequence is based on the base subcarrier spacing and the system bandwidth, and the part corresponds to the frequency band in the subset. The sequence subset may use one every K values of the DMRS sequence.

In another aspect of the present invention, a method of transmitting a downlink signal by a base station (BS) in a wireless communication system is provided. The method includes scheduling downlink data for a UE for a frequency band in a time slot; and transmitting to the UE the downlink data and a DMRS for the downlink data in the time slot on the frequency band in a system bandwidth. The frequency band may have a subcarrier spacing of $K*f_{sc}$ in the time slot, where $f_{sc}$ is a base subcarrier spacing and K is a positive integer. The DMRS may be a part of a sequence subset in a DMRS sequence. The DMRS sequence is based on the base subcarrier spacing and the system bandwidth, and the part corresponds to the frequency band in the subset. The sequence subset may use one every K values of the DMRS sequence.

In another aspect of the present invention, a BS for transmitting a downlink signal in a wireless communication system is provided. The BS includes an RF unit; and a processor configured to control the RF unit. The processor may be configured to schedule downlink data for a UE for a frequency band in a time slot, and to control the RF unit to transmit to the UE the downlink data and a DMRS for the downlink data in the time slot on the frequency band in a system bandwidth. The frequency band may have a subcarrier spacing of $K*f_{sc}$ in the time slot, where $f_{sc}$ is a base subcarrier spacing and K is a positive integer. The DMRS may be a part of a sequence subset in a DMRS sequence. The DMRS sequence is based on the base subcarrier spacing and the system bandwidth, and the part corresponds to the frequency band in the subset. The sequence subset may use one every K values of the DMRS sequence.

In each aspect of the present invention, the sequence subset includes values corresponding to a(K*n), where n=0, ..., N/K−1, among the values a(n) composing the DMRS sequence, where n=0, ..., N−1. Herein, N is the number of subcarriers in the system bandwidth, when the subcarrier spacing of the system bandwidth is the base subcarrier spacing $f_{sc}$.

In each aspect of the present invention, the base subcarrier spacing may be the smallest of subcarrier spacings supported by the wireless communication system.

In each aspect of the present invention, the base subcarrier spacing may be 15 kHz.

The above technical solutions are merely some parts of the examples of the present invention and various examples into which the technical features of the present invention are incorporated can be derived and understood by persons skilled in the art from the following detailed description of the present invention.

According to the present invention, uplink/downlink signals can be efficiently transmitted/received. Therefore, overall throughput of a radio communication system can be improved.

According to an example of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

DETAILED DESCRIPTION

Figure 1:
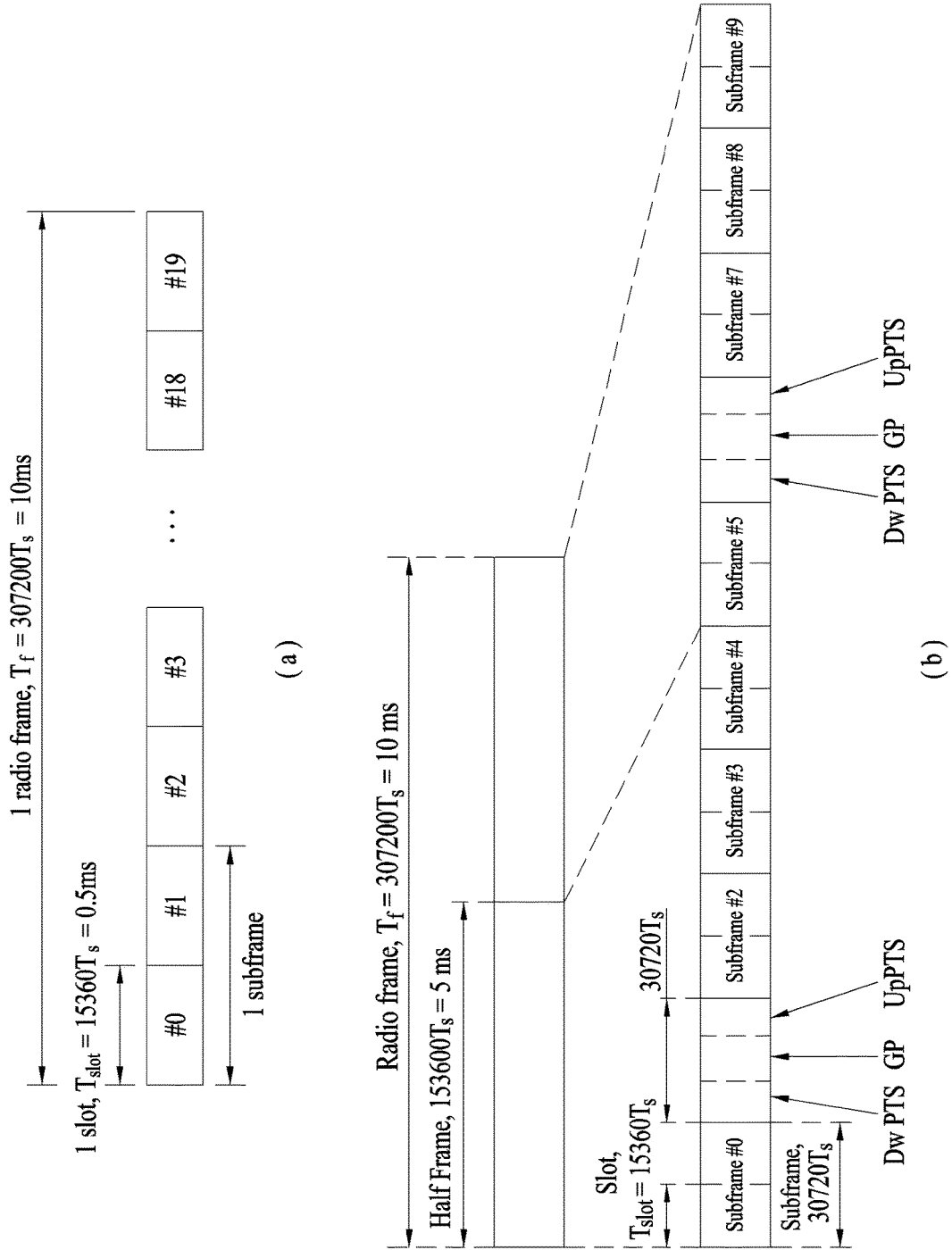
FIG. 1 illustrates the structure of a radio frame used in the LTE/LTE-A based wireless communication system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/ quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
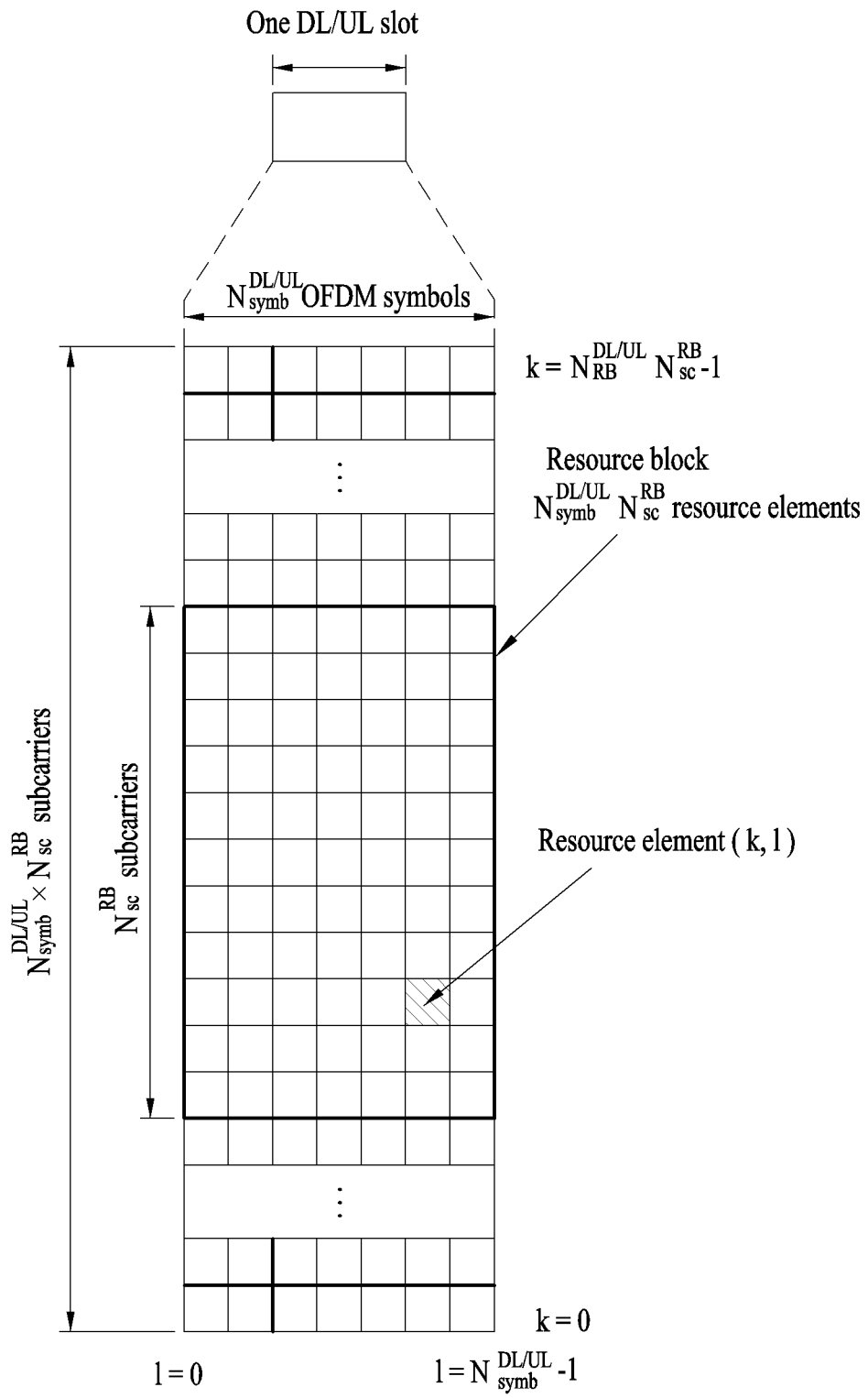
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{SC}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{SC}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{SC}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
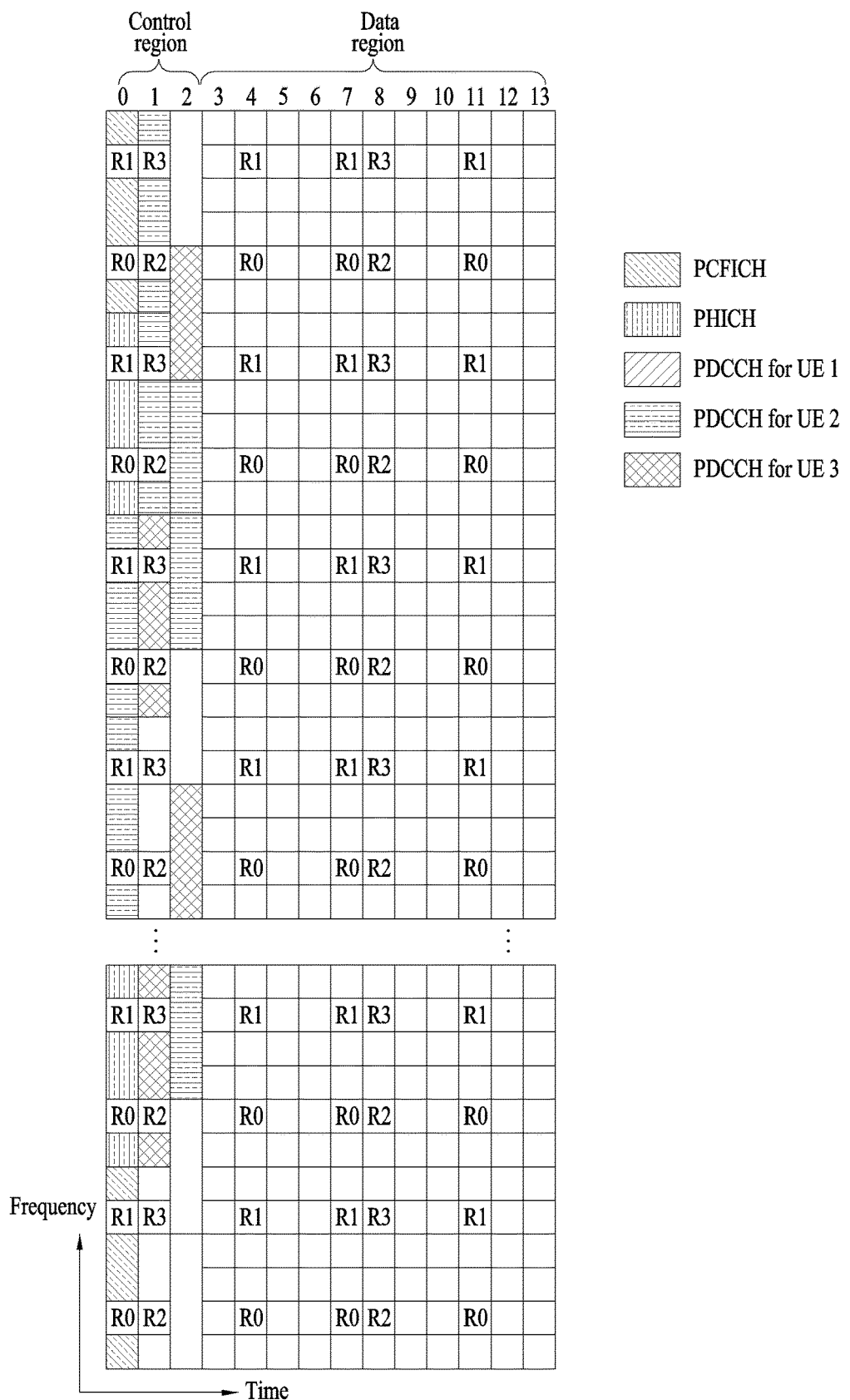
FIG. 3 illustrates the structure of a DL subframe used in the LTE/LTE-A based wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. A PDCCH including n consecutive CCEs may be transmitted only on CCEs fulfilling "i mod n=0" wherein i is a CCE number.

Figure 4:
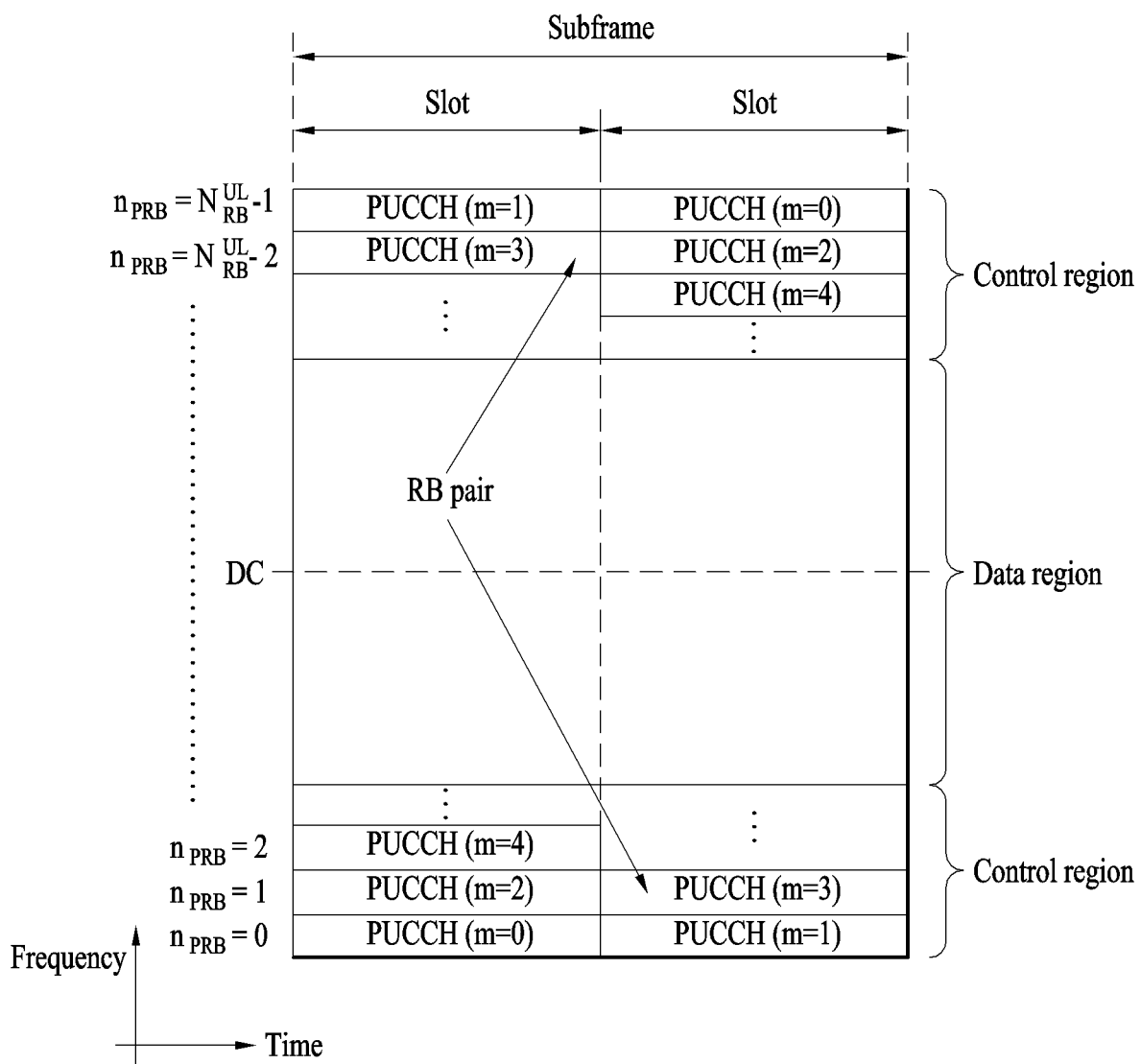
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
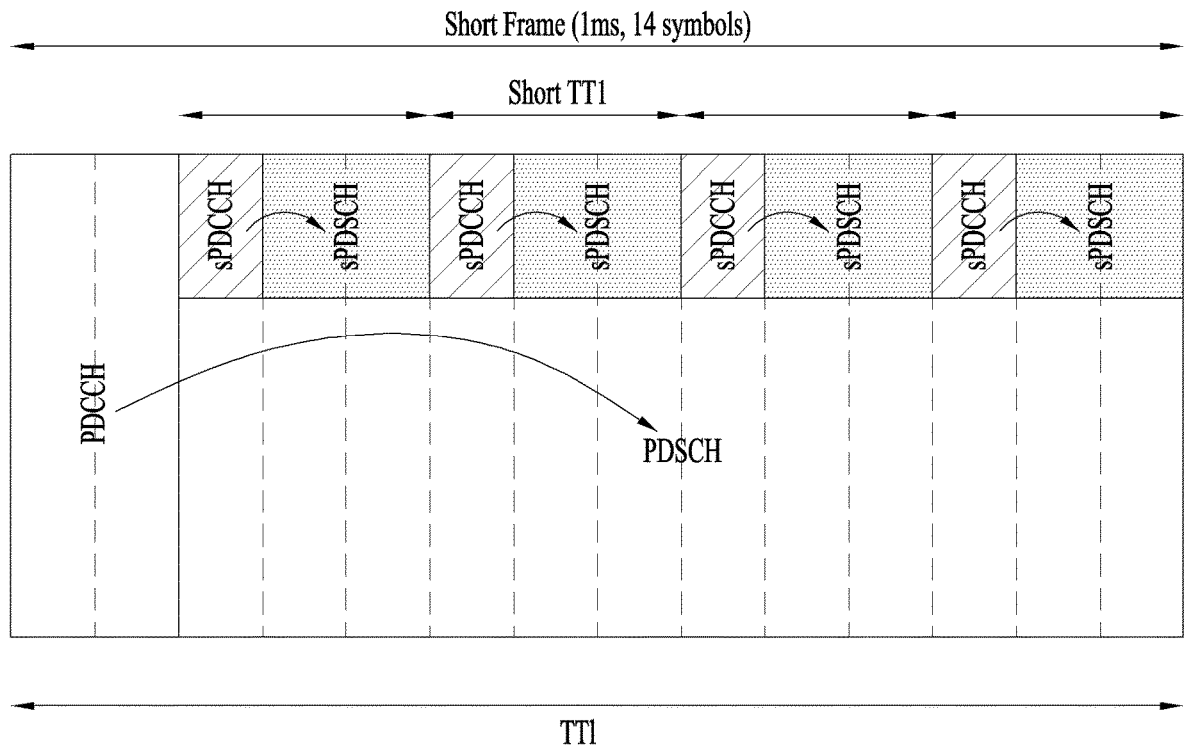
FIG. 5 illustrates an example of a short TTI and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to examples described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

A new RAT (NR) system may support both a data channel which can be scheduled in units of a subframe and a data channel which can be scheduled in units of a slot, where there are two slots in one subframe in the time domain. In this case, a physical-layer TTI is a 1-ms subframe in the legacy LTE/LTE-A system, whereas a physical-layer TTI may be one slot or one subframe in the NR system. Hereinbelow, the basic unit of scheduling is referred as a slot, a time slot, a subframe, or a TTI.

<OFDM Numerology>

The new RAT system uses an OFDM transmission scheme or a similar transmission scheme. For example, the new RAT system may follow the OFDM parameters defined in the following table. Or although the new RAT system still use a legacy LTE/LTE-A numerology, the new RAT system may have a wider system bandwidth (e.g., 100 MHz). Or one cell may support a plurality of numerologies. That is, UEs operating with different numerologies may co-exist within one cell.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
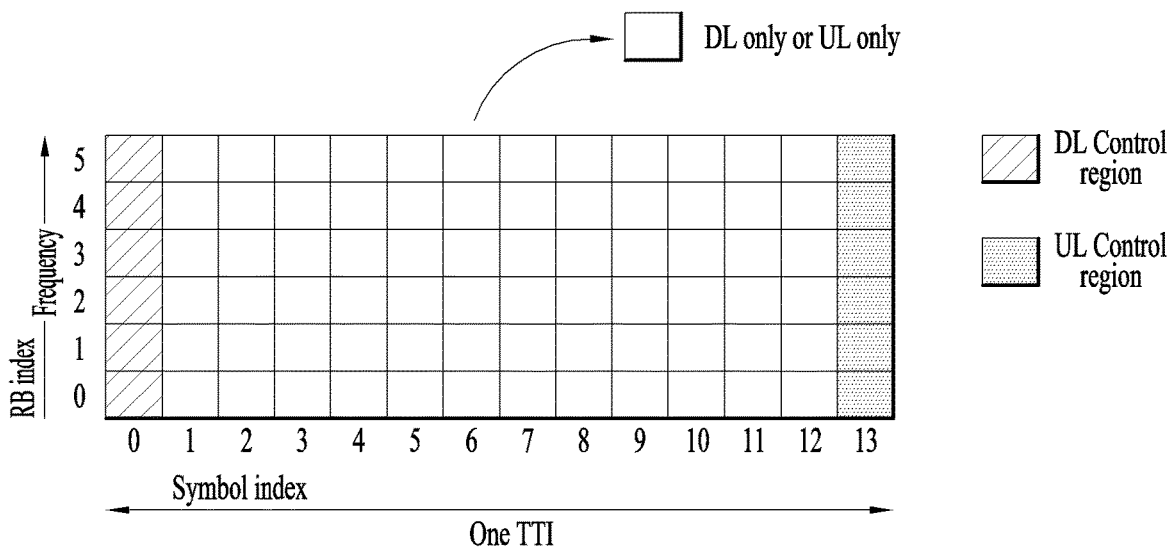
FIG. 6 illustrates a subframe structure.

FIG. 6 illustrates a new RAT (NR) subframe structure.

To minimize a data transmission delay, a subframe structure in which a control channel and a data channel are multiplexed in time division multiplexing (TDM) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 3) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

Figure 7:
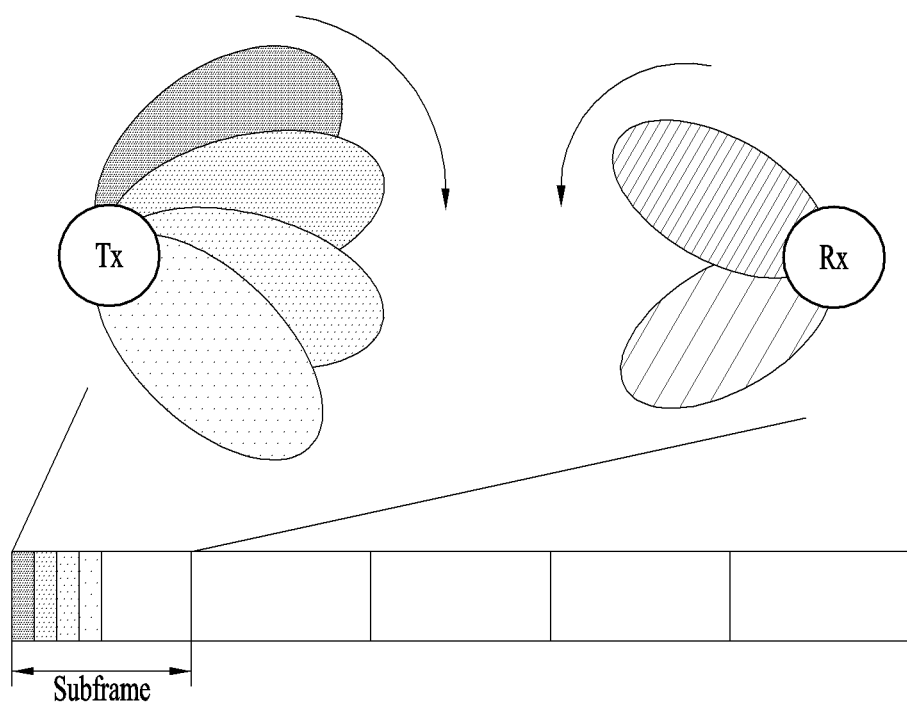
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception analog beam scanning.

Referring to FIG. 7, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

The present invention proposes a method of indexing time/frequency resources and mapping data to time/frequency resources by an eNB and a UE in order to transmit/receive data in a new RAT (NR) system.

Particularly, the present invention proposes a method of partitioning and indexing/mapping time/frequency resources in consideration of features that the NR system may have. Unlike a legacy system, the NR system may have, for example, the following differential features.

>The NR system may support different numerologies, and the different numerologies may be multiplexed in the same carrier.

>>A numerology may include a subcarrier spacing, a CP type/length, a symbol duration, and/or a subframe length.

>The transmission position of a synchronization signal may not be fixed.

>>A synchronization signal may be transmitted in any frequency position.

>Different use cases and/or different services may be multiplexed in the same carrier.

>A UE may support different use cases and/or different services in the same/different carriers.

Accurate understanding of a time-frequency area in which the NR system may operate, in consideration of the above features, is required between an eNB and a UE. Herein, an eNB may be a physical cell with a unique cell ID or a virtual cell. Or even though the eNB does not have a unique cell ID, the eNB may be a transmission and reception point (TRP) that transmits/receives data.

<A. Definition of Resource Block (RB)>

An RB is defined as a basic unit for data scheduling in a time-frequency area. If a plurality of different numerologies can be used in one carrier or one system, the time-frequency size of an RB may be changed by a numerology, particularly, a subcarrier spacing. Defining an RB as a basic unit for scheduling may mean that an RB is a minimum time-frequency area to which the same modulating and coding scheme (MCS) is applicable, when an eNB or a TRP schedules data for a specific link (e.g., downlink, uplink, or sidelink) of a specific UE.

If resources occupying one OFDM symbol along the time axis and one subcarrier along the frequency axis is referred to as a resource element (RE), a method of fixing the number of REs available for one RB may be considered. In the legacy LTE, for example, this method is similar to defining resources including 14 OFDM symbols along the time axis by 12 subcarriers along the frequency axis as one RB, in a normal CP case. That is, M symbols along the time axis by K subcarriers along the frequency axis may be defined as one RB in the NR system. The RB may be used as a basic unit for data scheduling in the NR system. The size of data that an eNB can schedule using an RB in an MCS (or code rate) may be determined according to the number of REs per RB.

Figure 8:
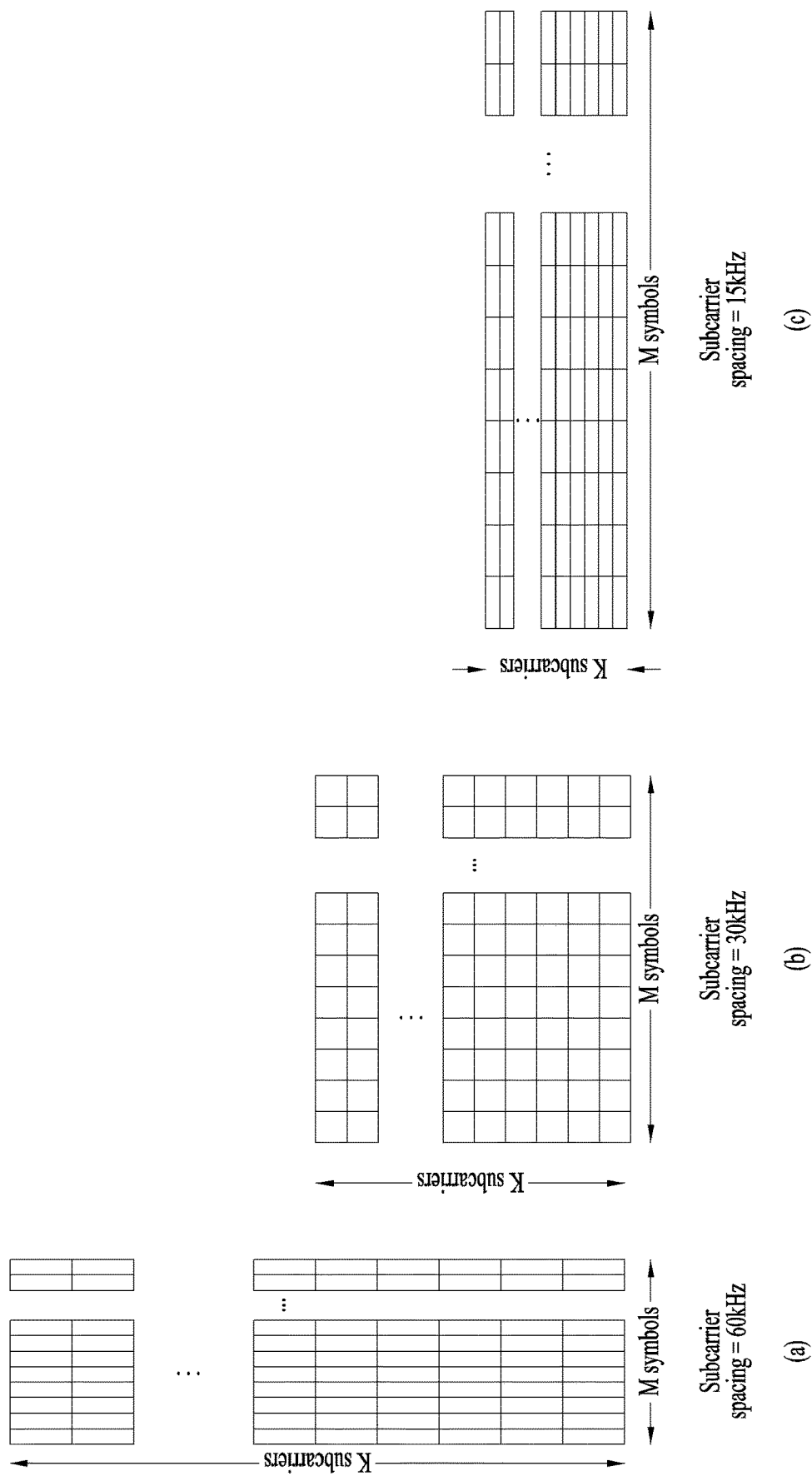
FIG. 8 illustrates a resource block(s) (RB(s)) according to the definition of an RB according to the present invention.

FIG. 8 illustrates an RB(s) according to the definition of an RB according to the present invention.

With the same number of OFDM symbols per subframe maintained for each of subcarrier spacings supported by a system, a subcarrier spacing, a symbol duration, and a subframe length may be scaled. If different numerologies are supported in this method, a CP length is scaled in the same manner as the subcarrier spacing, the symbol duration, and the subframe length. For example, as the subcarrier spacing increases, the CP length decreases as much, and as the subcarrier spacing decreases, the CP length increases proportionally. If the method of simply scaling an RB according to a subcarrier spacing is maintained, a delay spread that the corresponding system can tolerate according to a channel situation is preset, and a coherent bandwidth may be determined accordingly. For example, as illustrated in FIG. 8, in the case where each RB is defined by a fixed number of REs in spite of different subcarrier spacings of 15 kHz, 30 kHz, and 60 kHz, if the subcarrier spacings of 15 kHz, 30 kHz, and 60 kHz are all used in one system, and the coherent bandwidth of the system is 30 kHz*K subcarriers, the coherent bandwidth cannot be assumed in an RB defined by the 60-kHz subcarrier spacing. Therefore, in the case of 60-kHz subcarrier spacing, it may be preferable to divide the corresponding RB into two parts along the frequency axis and apply different MCSs to the two parts.

Therefore, the present invention proposes a method of configuring an RB. Particularly, the present invention first defines a minimum resource unit (RU) which is not affected by a numerology such as a subcarrier spacing, a CP length, or a subframe length, and proposes a method of configuring an RB with one or more RU sets. In the present invention, an RU-to-RB mapping method may be different according to a UE, a use case, a data type, or a data channel. In addition, a basic RU configuration may be configured by a PBCH or the like. Or a default RU may be defined, and then an RU (specific to a use case or a numerology) may be configured for each UE according to a use case and/or a used numerology.

A.1 Definition of Resource Unit (RU)

An RU may be defined by a shortest time unit on the time axis, in which data can be transmitted in the NR system, and a frequency-axis basic unit based on a base subcarrier spacing among subcarrier spacings supported by the NR system. It should be assumed that the length of the time-/frequency-axis basic unit of the RU has the same channel characteristics maintained in a corresponding frequency part. That is, a basic unit assumed to have the same channel characteristics maintained may be defined as an RU.

It may be assumed that NR candidate subcarrier spacings are 15 kHz, 30 kHz, and 60 kHz, and the number of OFDM symbols per subframe is M (e.g., 14, 12, or 16), for example, in a normal CP case. The absolute duration of a symbol in a subframe is scaled according to a subcarrier spacing.

Method a) RU: N_sym, N_sc

An RU may be defined as N_sym on the time axis by N_sc on the frequency axis. N_sym may represent the number of OFDM symbols in the RU, and N_sc may represent the number of subcarriers on the frequency axis in the RU. Particularly, N_sc may be defined as predetermined k subcarriers with a base subcarrier spacing of the corresponding system. Or N_sc may be defined as predetermined m subcarriers with a numerology having the largest subcarrier spacing among numerologies supported by the corresponding system. N_sym may be defined as the shortest time unit in which data can be transmitted. For example, if TTIs for data transmission include a TTI having the smallest number of, that is, m OFDM symbols in the NR system, N_sym may be defined as the number m of OFDM symbols in the TTI.

Figure 9:
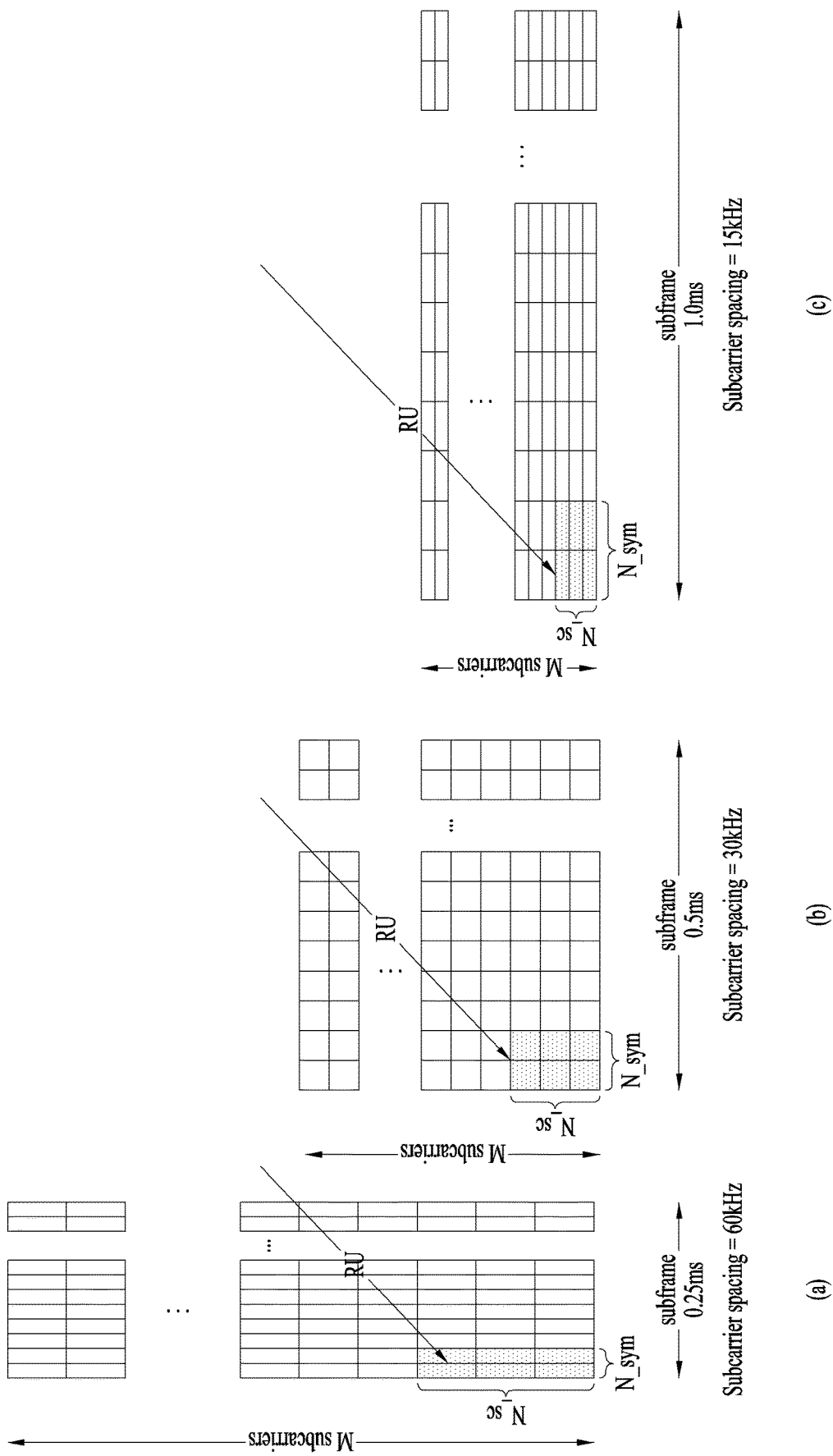
FIGS. 9 and 10 illustrate a method(s) of configuring a resource unit (RU) and an RB according to the present invention.
Figure 10:
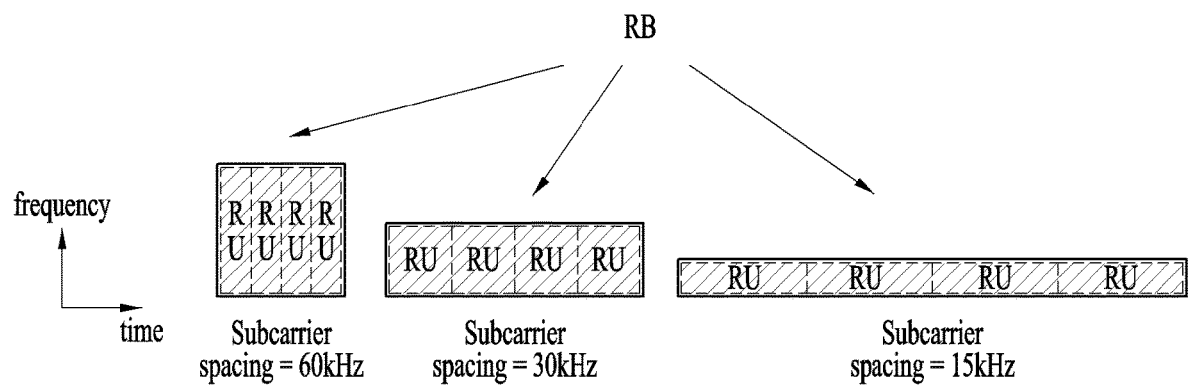
Figure 10:
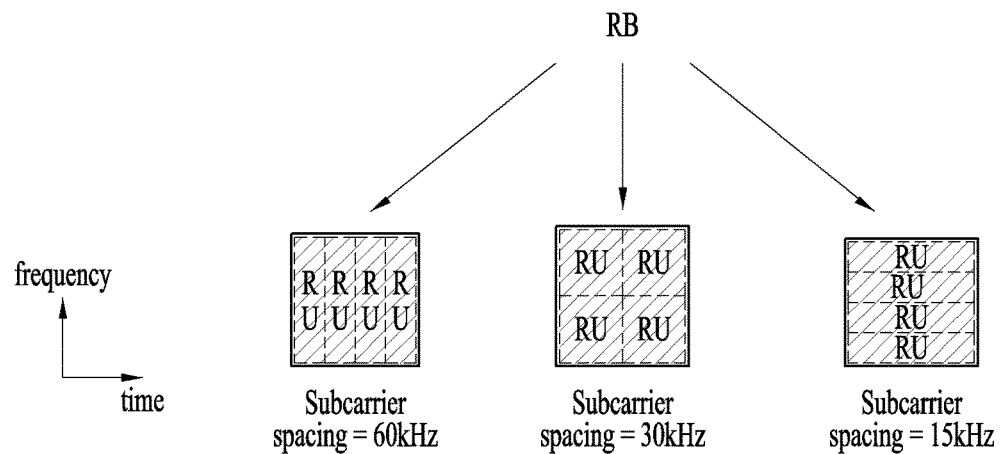

FIGS. 9 and 10 illustrate a method(s) of configuring an RU and an RB according to the present invention. Particularly, FIG. 9 illustrates an exemplary RU definition, and FIG. 10 illustrates exemplary RBs according to subcarrier spacings.

FIG. 9 illustrates an exemplary case in which N_sc is defined based on the 60-kHz subcarrier spacing, and N_sc=3. In determining N_sc, a numerology supported by the system, particularly a subcarrier spacing and/or a CP length is considered. If a case in which a plurality of numerologies are multiplexed in one system, particularly in one subband/carrier, N_sc should be determined in consideration of a coherent bandwidth based on a base or default numerology. If the shortest TTI with the 60-kHz subcarrier spacing includes, for example, two OFDM symbols, N_sym=2.

If an RU is defined as illustrated in FIG. 9, RBs for respective subcarrier spacings are illustrated in FIG. 10. In the RB configuration method illustrated in FIG. 10(a), RUs forming an RB are mapped contiguously along the time axis. Each RB is configured with RUs in the same manner irrespective of numerologies in FIG. 10(a). FIG. 10(b) illustrates different RB configuration methods for different subcarrier spacings. For example, in consideration of a coherent bandwidth, the size of the frequency-axis bandwidth of one RB is maintained equal irrespective of subcarrier spacings in FIG. 10(b).

Method b) RU: Tmin, Fmin

Figure 11:
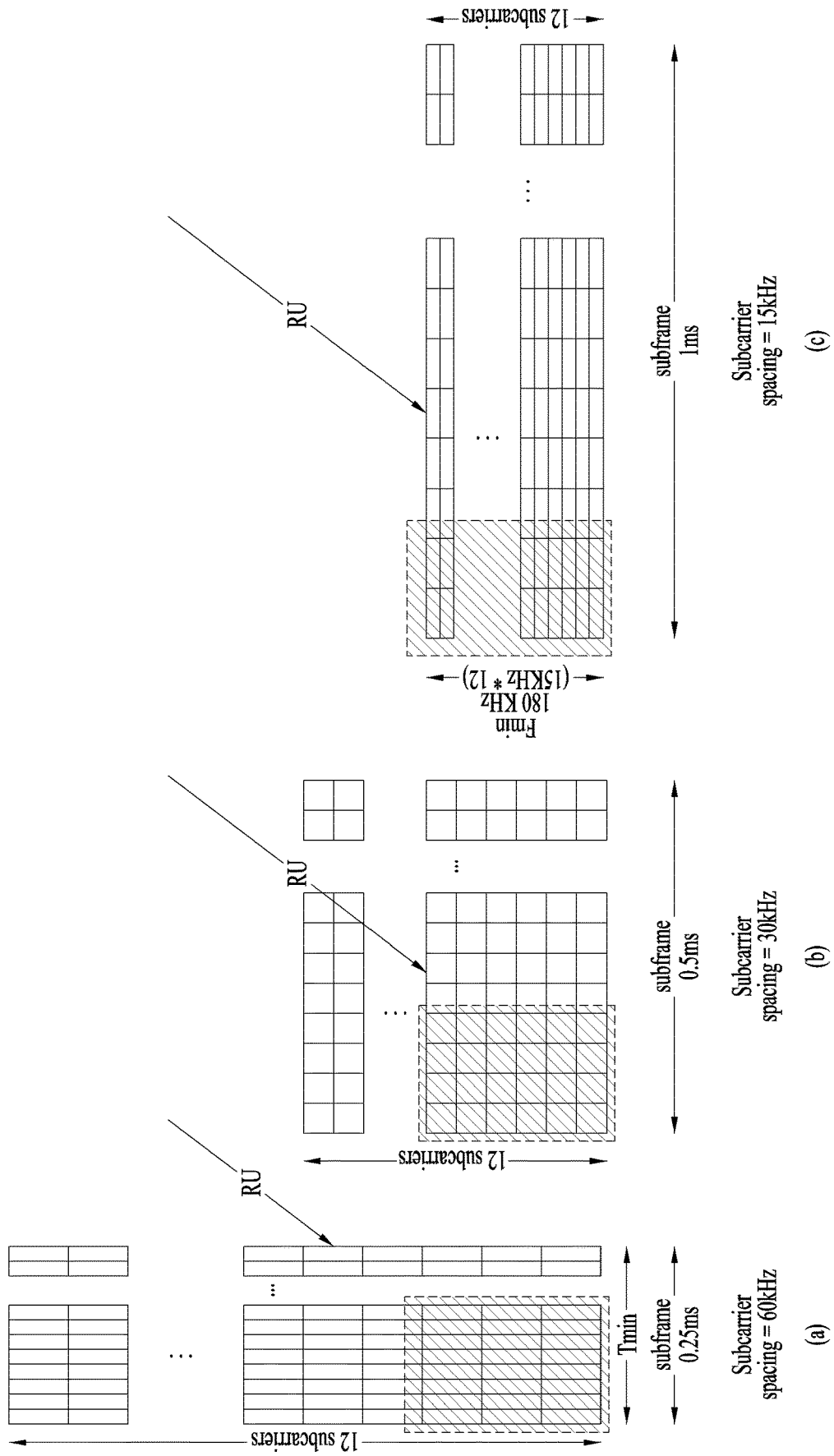
FIGS. 11 and 12 illustrate other method(s) of configuring an RU and an RB according to the present invention.
Figure 12:
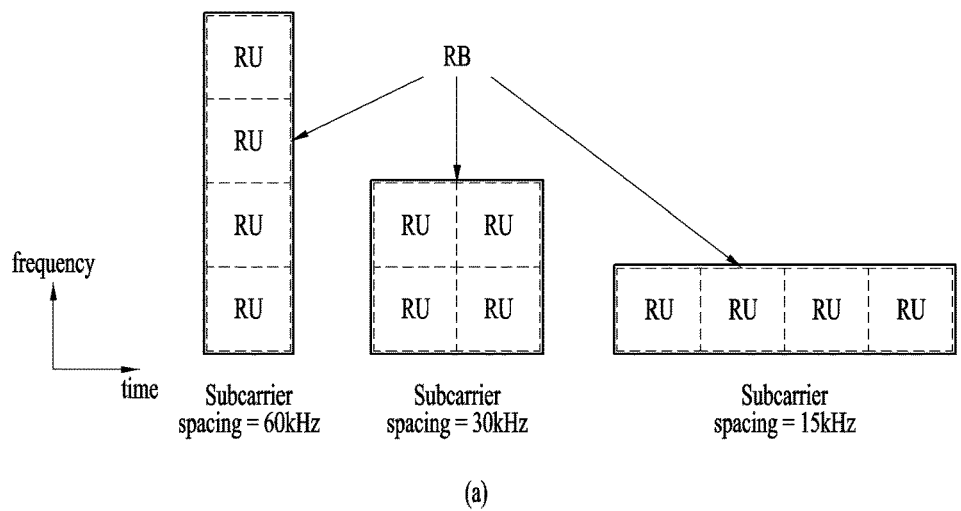
Figure 12:
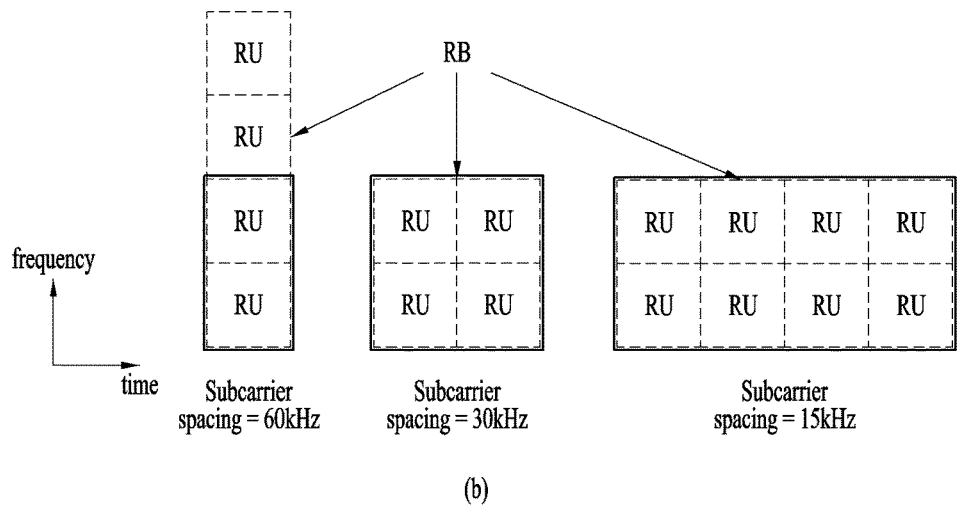
Figure 12:
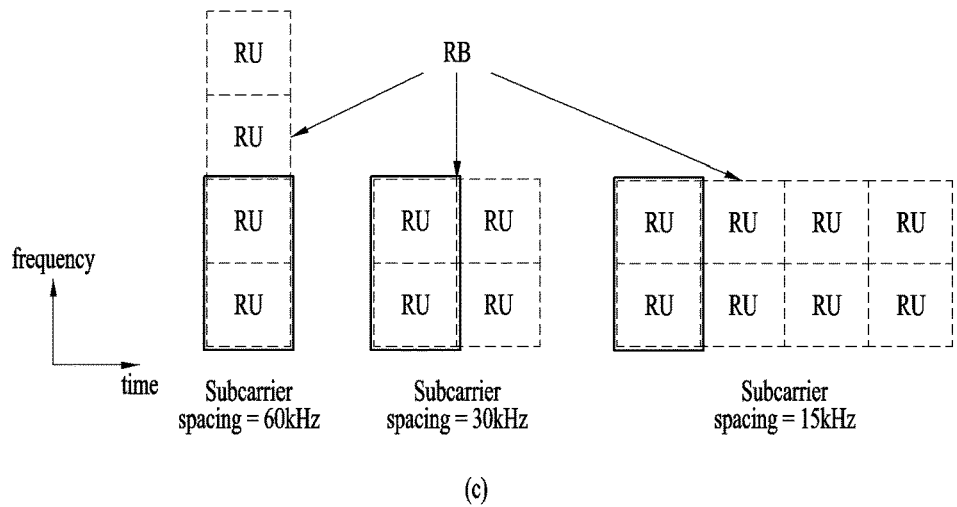

FIGS. 11 and 12 illustrate other method(s) of configuring an RU and an RB according to the present invention.

An RU may be defined as a unit having an absolute time/frequency value on the time/frequency axis. In FIG. 11, Fmin may be determined on the assumption of 15 kHz as a base subcarrier spacing, and Tmin may be determined based on the length of a subframe having a shortest time duration (or a shortest TTI length). For example, if Tmin=0.25 ms and Fmin=180 kHz, and an RUs is defined as illustrated in FIG. 11, RBs defined according to subcarrier spacings are illustrated in FIG. 12.

The method of defining an RU by a minimum resource size which is not affected by a numerology such as a subcarrier spacing, a subframe length, and a CP length has been described above. Hereinbelow, a method of defining an RU according to each numerology is proposed. The number of symbols and the number of subcarriers in an RB may be defined differently according to a numerology, particularly a subcarrier spacing and/or a CP length. Particularly if the smallest time unit for data transmission/reception is different for each numerology, the length of the basic time-axis unit of an RU may be different for each numerology.

Method c): Define RU on Basis of Default Numerology

An RU may be defined based on a default numerology (e.g., a default subcarrier spacing, or a default CP length). In the present invention, the default numerology is a base numerology of the system, also called a common numerology or a reference numerology. A numerology that all UEs should support to receive a service in a system, among a plurality of numerologies supported by the system, or a numerology with which a signal such as system information and a paging is transmitted may be defined as the default numerology. The default numerology may be defined as a numerology with which a synchronization signal and a PBCH are transmitted, and may be defined as a numerology with which system information other than the synchronization signal and the PBCH is broadcast, or a numerology that all UEs use to support fall-back mode in the system. A numerology based on which a resource grid is formed in one system may be defined as the default numerology. An RB configured/defined with a numerology other than the default numerology may be scaled and defined from the default numerology. That is, an RU is defined based on the default numerology, and the number of time symbols per RU and the number of subcarriers per RU may be scaled according to a numerology, particularly a subcarrier spacing, while the time/frequency size of the defined RU is maintained.

Figure 13:
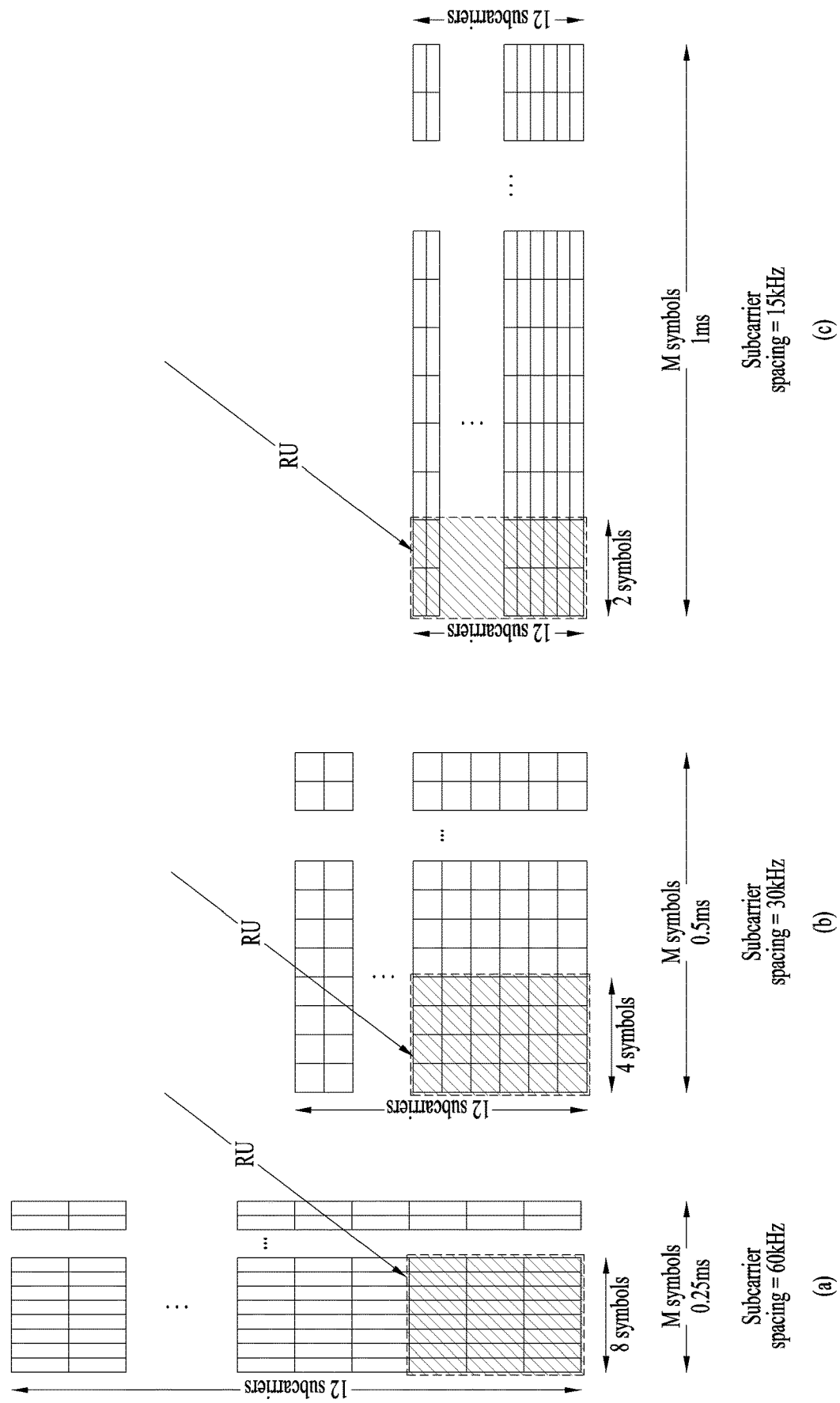
FIG. 13 illustrates the definition of an RU based on a default numerology.

FIG. 13 illustrates RUs defined based on a default numerology. Referring to FIG. 13(c), given a default subcarrier spacing of 15 kHz, an RU may be defined based on 15 kHz. As illustrated in FIG. 13(b), for the 30-kHz subcarrier spacing, a chunk having the time-frequency size of an RU defined with the default subcarrier spacing includes 4 OFDM symbols on the time axis by 6 subcarriers on the frequency axis. As illustrated in FIG. 13(c), for the 60-kHz subcarrier spacing, a chunk having the time-frequency size of the RU defined with the default subcarrier spacing includes 8 OFDM symbols on the time axis by 3 subcarriers on the frequency axis.

A.2 RU-to-RB Mapping

One RB may be configured as a set of one or more RUs. An RB configuration method may be different according to a UE, a use case, a data type, or a data channel. That is, a plurality of options may be set for RU-to-RB mapping, and defined differently according to a data type, a use case, or a physical channel.

Figure 14:
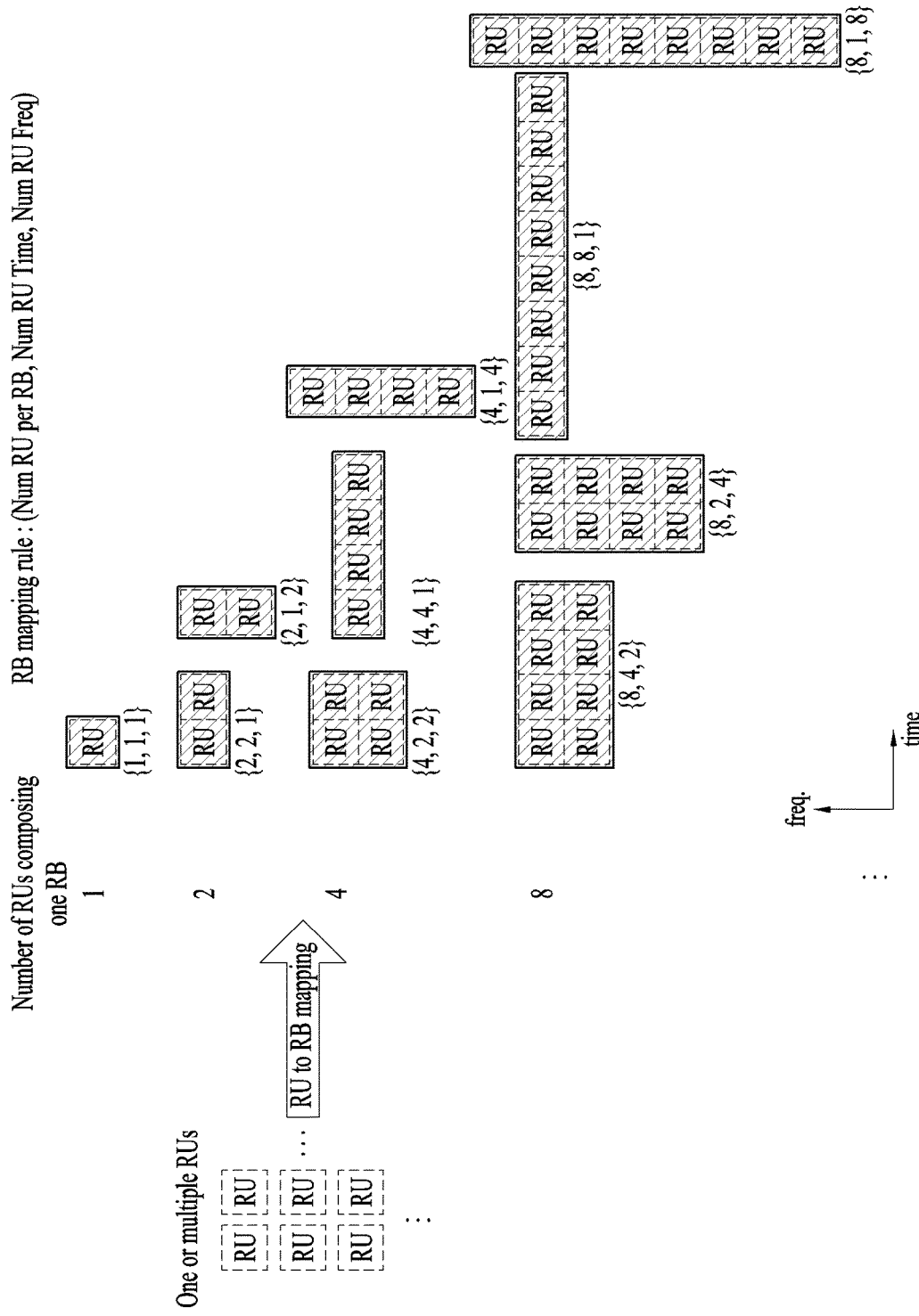
FIG. 14 illustrates RU-to-RB mapping methods.

As illustrated in FIGS. 9 and 10, a plurality of rules may be available to map one or more RUs to one RB. FIG. 14 illustrates exemplary RU-to-RB mapping methods. Referring to FIG. 14, a different number of RUs may form an RB, and a different RB configuration method may be used even though one RB is configured to include the same number of RUs.

An RU-to-RB mapping method may be determined by the number of RUs per RB, and the number of RUs on the time axis/frequency axis of an RB. For example, the RU-to-RB mapping method may be represented by, for example, NumRUperRB, NumRUTime, and NumRUFreq. NumRUperRB represents the number of RUs per RB, NumRUTime represents the number of contiguous RUs along the time axis in an RB, and NumRUFreq represents the number of contiguous RUs along the frequency axis in an RB.

There may be many RB configuration methods, that is, many methods of mapping one or more RUs to one RB. A different RB configuration method may be used according to a use case, a physical channel, or a numerology. When a number of RU-to-RB mapping methods are available and a UE is capable of using a plurality of RU-to-RB mapping methods, a TRP should signal information about an RU-to-RB mapping method to the UE. If the RU-to-RB mapping method may be changed dynamically, the TRP may indicate an RU-to-RB mapping method to the UE by a dynamic control indicator (DCI), each time data transmission is scheduled. If a different RU-to-RB mapping method is used according to a specific channel (e.g., a DL data channel, a UL data channel, an SL data channel, or a broadcast channel), a use case, or a specific numerology, an RU-to-RB mapping method may be implicitly set for each channel, each use case, or each numerology. Or an RU-to-RB mapping relationship/method may be preconfigured/signaled to a UE(s), semi-statically by higher-layer signaling.

Data may be scheduled for the UE in units of an RB bundle including one or more RBs. Bundled RBs may be referred to as an RB group (RBG), and a reference signal (RS) may be predetermined on an RBG basis. However, since an RB configuration method may be different according to a use case, a service, a channel, or the like, an RS pattern in an RBG may also be different according to a use case, a service, a channel, or the like. The same RS pattern may be maintained in an RBG, for the same use case, service, or channel.

Another RB configuration method is to maintain the same number of REs in an RB irrespective of subcarrier spacings. For example, if a subcarrier spacing increases, this RB configuration method may reduce the number of time symbols on the time axis, with the number of subcarriers on the frequency axis maintained in an RB, or may reduce number of subcarriers on the frequency axis, with the number of time symbols on the time axis maintained in the RB.

In another RB configuration method, an RB may be defined based on a default numerology, similarly to Method c in section A.1. An RB may be defined based on a default numerology, and the number of symbols per RB and the number of subcarriers per RB may be scaled according to a numerology, particularly a subcarrier spacing, with the time/frequency size of the defined RB maintained. If an RU is defined in the method illustrated in FIG. 9, an RB may be defined in a different manner according to a subcarrier spacing, as illustrated in FIG. 10(b). An RB is defined based on a default subcarrier spacing, and if a subcarrier spacing is changed, the number of OFDM symbols per RB and the number of subcarriers per RB are scaled. That is, after an RB is defined by a default numerology, the numbers of subcarriers and OFDM symbols in the RB may be changed, with the size of a time-frequency chunk maintained equal in the RB. For example, if the default numerology is 15 kHz for an RB, the RB may be defined by 14 OFDM symbols on the time axis by 12 subcarriers on the frequency axis, based on 15 kHz. Then, an RB with the subcarrier spacing of 30 kHz may be configured with 28 symbols on the time axis by 6 subcarriers on the frequency axis, and an RB with the subcarrier spacing of 60 kHz may be configured with 56 symbols on the time axis by 3 subcarriers on the frequency axis. This RB configuration method facilitates multiplexing of different numerologies on the time and frequency axes, and imposes no constraint on the positions of RBs with different numerologies. Further, this RB configuration method may advantageously enable application of common physical RB indexing to different numerologies in a later-described physical RB indexing method. Herein, it is preferable to design an RS pattern(s) such that RSs have a predetermined pattern in a combination of a plurality of RBs or a plurality of RUs.

<B. RB Indexing Method>

Unlike the legacy LTE/LTE-A system, a plurality of numerologies may be used in one carrier in the NR system. Even though RBs are defined, the RBs should be indexed in a time/frequency area, particularly in the frequency area, for the purpose of signaling by which an eNB indicates the time-frequency position of an RB to a UE. RB indexing may be different according to a numerology (particularly, a subcarrier spacing) or an RB configuration method. Further, RB indexing may be different according to the maximum bandwidth capability of a UE. Hereinbelow, RB indexing methods based on a numerology and the maximum bandwidth capability of a UE are proposed.

B.1 Logical Indexing Method

Figure 15:
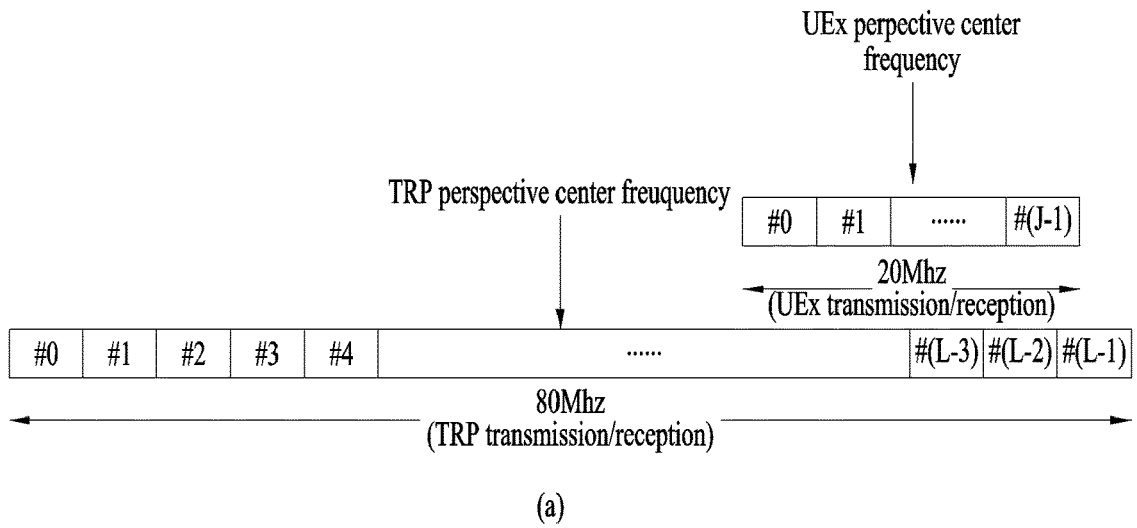
FIG. 15 illustrates an RB indexing method according to the present invention.
Figure 15:
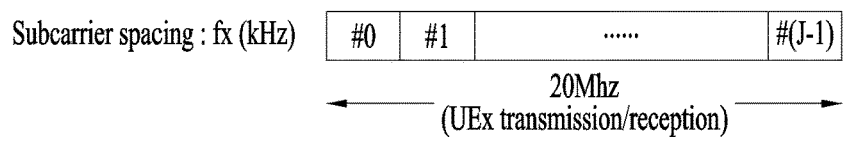
Figure 15:
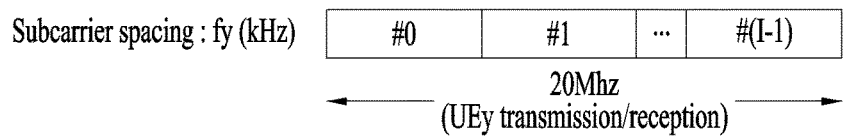
Figure 15:
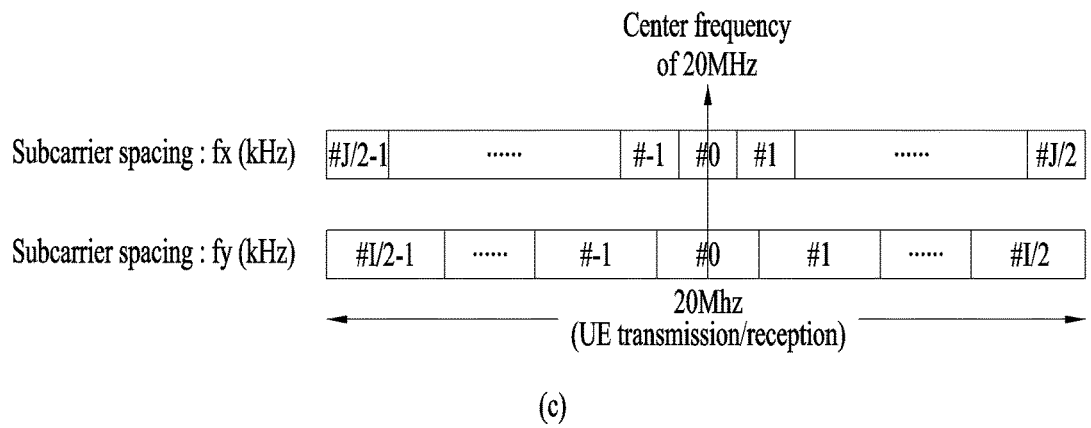

FIG. 15 illustrates an exemplary RB indexing method according to the present invention.

Depending on the capability of a UE, a UE-perspective system bandwidth may be different from a TRP/system-perspective system bandwidth. For example, even though a TRP operates a 80-MHz system, a specific UE may only have to receive a service in a partial band without the need for a service/monitoring across the total 80 MHz, according to a use case, a UE category, a UE capability, and/or UE battery consumption, which are to be supported by/for the UE. In other words, on the assumption that although the channel bandwidth of one carrier (i.e., a system bandwidth) is 80 MHz, the specific UE receives a service only in 20 MHz, system-perspective RB indexing may be different from UE-perspective RB indexing. Further, if a system/TRP-supported system bandwidth is different from a system bandwidth based on a UE capability, a service, or a use case, a system-perspective center frequency may be different from a UE-perspective center frequency. As noted from FIG. 15(a), logical RB indexing and the position of a center frequency from the perspective of a TRP operating 80 MHz may be different from logical RB indexing and the position of a center frequency from the perspective of a UE supporting 20 MHz. Further, as noted from FIG. 15(b), the absolute time/frequency position of a logical index may be different even in the same frequency band or frequency bands of the same size, according to a subcarrier spacing supported by a specific UE/or applied to the specific UE/or applied to a specific use case.

If data is scheduled UE-specifically, the data may be scheduled just by unique logical indexing between a TRP and a specific UE. The TRP may schedule data for other UEs as well as the specific UE by separate logical indexing.

The logical index of an RB may be determined by a system bandwidth, a subcarrier spacing, and/or the number of subcarriers per RB. The logical index of the RB may be UE-specific. Herein, the system bandwidth may refer to a UE-perspective system bandwidth. Let a subcarrier spacing be denoted by $f_i$. Then, the maximum number of logical indexes, $N_{max,i}$ may be defined, for example, by $N_{max,i} = \text{floor}\{BW_{sys\_UE}/(k*f_i)\}$ where $BW_{sys\_UE}$ is the UE-perspective system bandwidth, k is the number of subcarriers per RB, and $f_i$ is a subcarrier spacing used to build an RB, and may be used specifically in a corresponding subband $BW_{sys\_UE}$.

As illustrated in FIG. 15(b), the logical indexes of RBs may be assigned sequentially in an ascending order from a low frequency band to a high frequency band. Or as illustrated in FIG. 15(c), RBs may be indexed with respect to a center frequency. In the illustrated case of FIG. 15(c), TRP-perspective RB indexes may also increase and decrease with respect to the center frequency.

B.2 Logical Index-to-Physical Index Mapping Method

UE-specific data scheduling may be performed by UE-specific logical indexing. However, for a signal/channel destined to a plurality of UEs in one cell/system, such as system information, signaling of the accurate time/frequency area of the signal/channel is needed, instead of UE-specific logical indexing. For example, although a dedicated channel/dedicated signaling for a specific UE may be scheduled by a logical RB index(es), a UE-common channel/signaling for a plurality of UEs or a channel/signaling for a specific UE group should be scheduled by an absolute physical index(es), instead of a logical RB index(es).

Therefore, a method of mapping logical indexes to physical indexes is required. Hereinbelow, a method of mapping logical RB indexes to physical RB indexes is proposed. In relation to the method of mapping logical RB indexes to physical RB indexes, a position in which each subband or carrier (hereinafter, referred to as subband/carrier) can be defined within a TRP-perspective system band needs to be considered.

Figure 16:
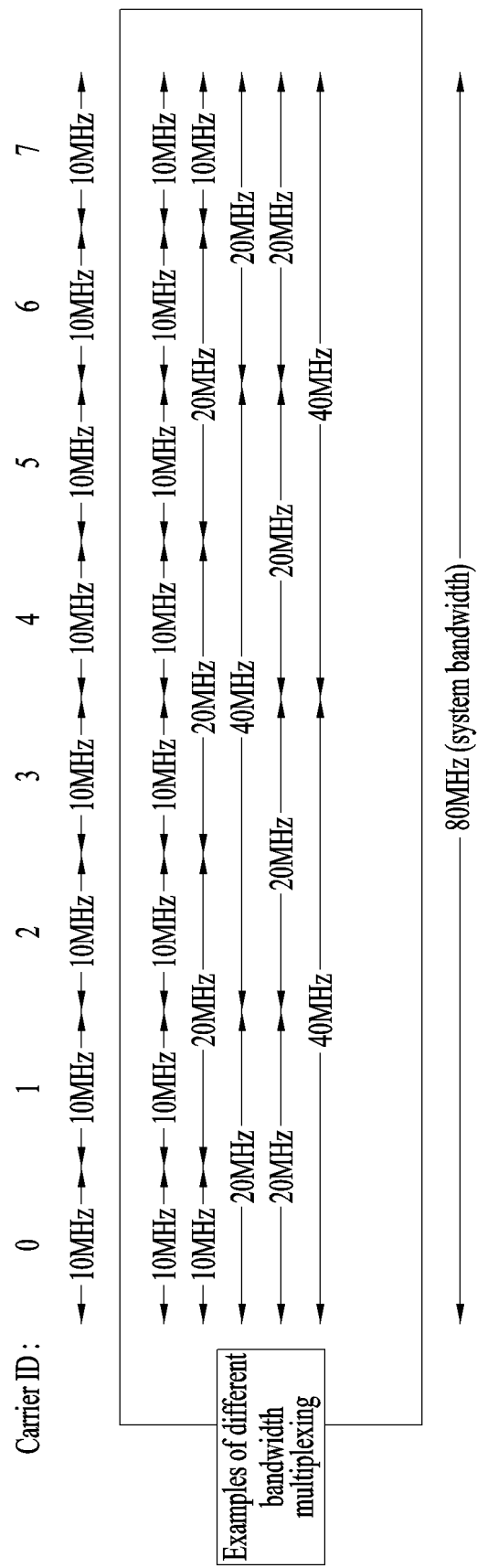
FIG. 16 illustrates bandwidth configurations according to the present invention.

FIG. 16 illustrates exemplary bandwidth configurations according to the present invention.

As illustrated in FIG. 16, subbands/carriers may be multiplexed within a total system bandwidth, and logical RB indexes should be mapped to physical RB indexes by reflecting the absolute frequency-axis position of a corresponding subband/carrier. For example, for a TRP having an 80-MHz system, subbands/carriers having various bandwidths (BWs) may be combined within 80 MHz, as illustrated in FIG. 16. For reference, a synchronization signal (SS) may be transmitted in each subband identified by a carrier ID in FIG. 16.

Even though a UE has performed initial time-frequency synchronization by receiving a PSS/SSS in any subband/carrier, the system should inform the UE of a relative position of the subband/carrier accessed initially by the UE in the system bandwidth (e.g., a frequency difference between the center frequency of the system bandwidth and the center frequency of the subband/carrier) via the PSS/SSS, via an additional SS, or via an RACH procedure. Or the UE may implicitly detect the relative position of the subband/carrier by a specific signal. The UE may acquire the absolute frequency value of a frequency in which the UE has detected the SS in an SS detection procedure according to a frequency raster for initial access. If the network signals the bandwidth of the corresponding subband/carrier and/or the system bandwidth to the UE, the UE may acquire the absolute frequency position of the subband/carrier carrying the detected SS as well as the relative frequency position of the subband/carrier.

Logical RB indexes may be assigned specifically to each subband/carrier, for each UE. Logical RB indexing may be agreed between a TRP and a UE according to the bandwidth of a subband/carrier, and a subcarrier spacing and RB configuration method.

A system-supported numerology (e.g., a subcarrier spacing, the number of OFDM symbols per subframe, and a CP length) and physical RB indexing per RB indexing method may be supported by the TRP/UE. When logical RB indexes are mapped to physical RB indexes, physical RB indexes may be calculated according to one of a plurality of physical RB indexing methods based on a numerology used for the logical RB indexing. Then, the UE may map its logical RB indexes to physical RB indexes according to an indicated/signaled physical RB indexing method, based on the relative position of the corresponding subband/carrier in the system bandwidth, that is, by applying the relative position as an offset. Or physical RB indexing may be estimated by using the numerology (e.g., a subcarrier spacing and a CP length) and RU-to-RB mapping method used for the logical RB indexing in the corresponding subband/carrier.

In PRB indexing per subcarrier spacing for a system bandwidth, the size of a per-subcarrier spacing system bandwidth may be considered additionally. For example, if a TRP-perspective band operated by a TRP is 80 MHz, it is practically difficult for a UE having the subcarrier spacing of 15 kHz to receive a service at one time in the 80-MHz band. For example, if the UE is to support the 15-kHz subcarrier spacing in a 20-MHz band, an FFT size of $2^n$ should be equal to or larger than '20 MHz/15 kHz'. Therefore, on the assumption that the UE performs an FFT of size 2048, the UE is capable of supporting only a band of up to 20 MHz with the subcarrier spacing of 15 kHz. To support a 40-MHz band with the subcarrier spacing of 15 kHz, an FFT of size 4096 is required. Meanwhile, the UE may support a band of up to 80 MHz for the subcarrier spacing of 60 kHz.

Therefore, considering a system bandwidth in terms of a subcarrier spacing and the FFT size of a UE, if PRB indexing for a system bandwidth is performed for up to 20 MHz with the subcarrier spacing of 15 kHz, indexing is not performed successfully in a TRP-perspective system band. If a default numerology, for example, a default subcarrier spacing is 15 kHz for the TRP-perspective system band, the following two indexing methods are available as indexing methods based on the subcarrier spacing of 15 kHz.

Figure 17:
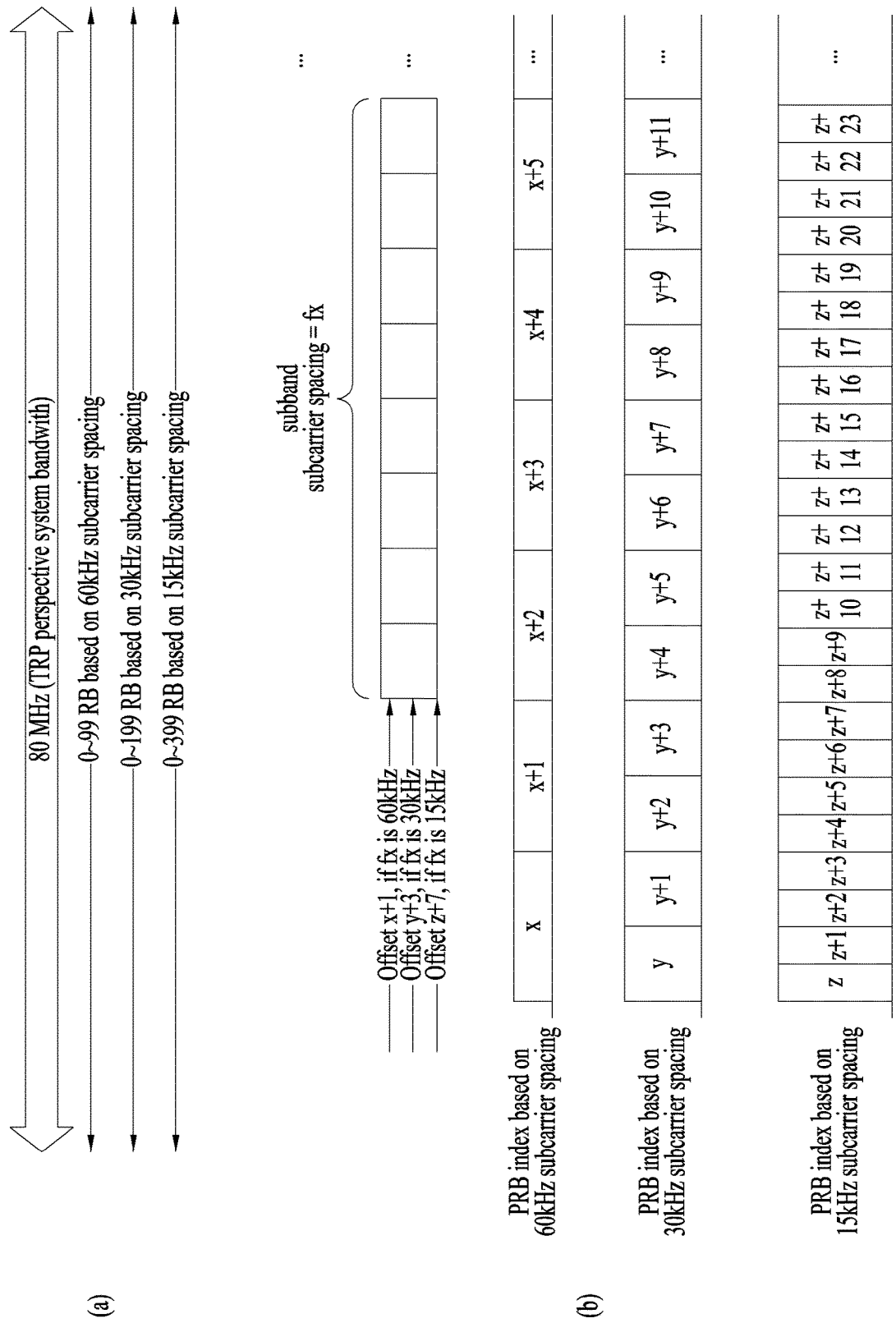
FIG. 17 illustrates logical indexing and physical indexing according to a method of the present invention.

* Method 1) FIG. 17 illustrates logical indexing and physical indexing according to an example of the present invention.

Referring to FIG. 17(a), PRB indexing may be performed for all subcarrier spacings supported by the system irrespective of a maximum bandwidth supported by a UE for each subcarrier spacing, which is set due to a limited FFT size of the UE. For example, for the 15-kHz subcarrier spacing, the UE performs PRB indexing with the 15-kHz subcarrier spacing irrespective of a maximum system bandwidth supported by the UE, with the 15-kHz subcarrier spacing-based system bandwidth limited to up to 20 MHz for the UE. Likewise, for the 30-kHz subcarrier spacing, PRB indexing is also performed for the total TRP-perspective system bandwidth. Then, logical RB index-to-physical RB index mapping is performed based on a per-numerology PRB indexing method.

FIG. 17(b) illustrates a PRB indexing method according to a subcarrier spacing, and a logical RB-to-physical RB mapping method in any subband/carrier. Referring to FIG. 17(b), if the subcarrier spacing of 60 kHz is used for logical RB indexing in a specific subband/carrier (i.e., the subcarrier spacing used in the corresponding subband/carrier is 60 kHz), logical RB indexes are mapped to physical RB indexes, with a PRB index offset of x+1. If the subcarrier spacing of 30 kHz is used for logical RB indexing in a specific subband/carrier (i.e., the subcarrier spacing used in the corresponding subband/carrier is 30 kHz), logical RB indexes are mapped to physical RB indexes, with a PRB index offset of y+3. The offset of PRB indexes may be calculated from a subcarrier spacing and/or an RU-to-RB mapping method, and a relative position of a corresponding subband/carrier in a system band.

Figure 18:
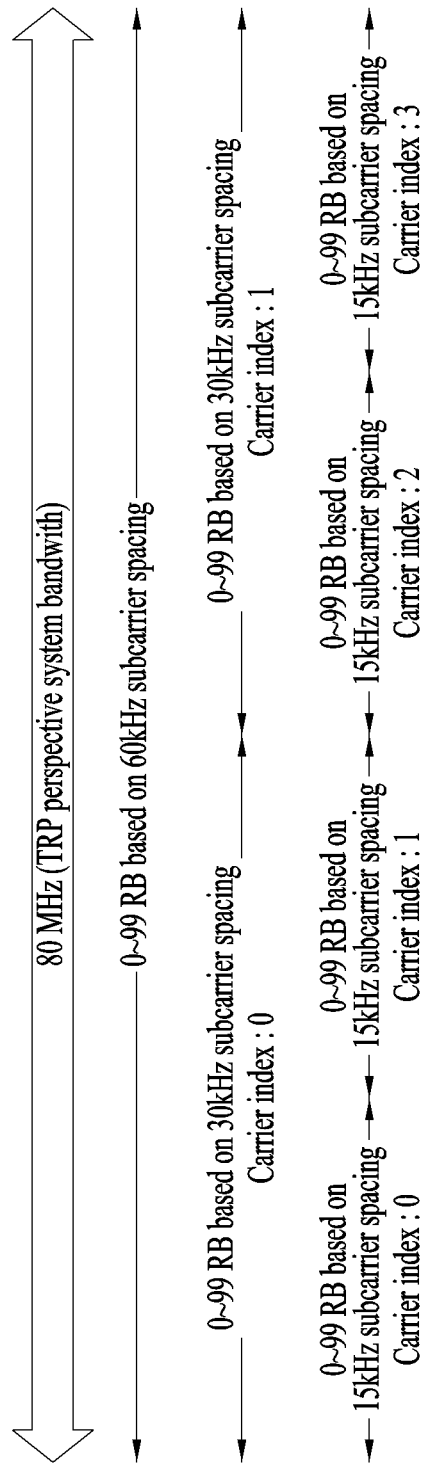
FIG. 18 illustrates logical indexing and physical indexing according to another method of the present invention.

* Method 2) FIG. 18 illustrates logical indexing and physical indexing according to another method of the present invention.

In Method 2, indexing is performed such that a maximum PRB index corresponds to the maximum number of PRBs supported for each subcarrier spacing according to a limited FFT size of a UE. For the 15-kHz subcarrier spacing, 400 RBs exist in a TRP-perspective system bandwidth of 80 MHz. A subband/carrier index may be assigned separately to each 20-MHz bandwidth within the 80-MHz system bandwidth, and a per-subcarrier spacing or per-subband/carrier bandwidth subband/carrier index and a logical index in the corresponding subband/carrier may substitute for a PRB index. Information broadcast or multicast by the TRP may comply with a PRB indexing method based on a subcarrier spacing with which the information is transmitted, and the TRP may signal to the UE which indexing the UE should use. For example, the TRP may signal a subcarrier spacing, a carrier index, and etc. to the UE.

B.3 RS Scrambling Method

Now, a description will be given of a method of generating a DMRS sequence for data demodulation. For reference, a method of generating a UE-specific RS (hereinafter, referred to as UE-RS) sequence in the LTE/LTE-A system as described in 3GPP TS 36.211 will be described below.

For an antenna port p∈{7, 8, . . . , ν+6}, a UE-RS sequence r(m) is defined by the following equation.

$$r(m) = \frac{1}{\sqrt{2}}(1 - 2 \cdot c(2m)) + j\frac{1}{\sqrt{2}}(1 - 2 \cdot c(2m+1)),$$  Equation 1

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Herein, $N^{max,DL}_{RB}$ is a largest DL bandwidth configuration, represented as a multiple of $N^{RB}_{sc}$. c(i) is a pseudo-random sequence, which is defined by a length-31 Gold sequence. An output sequence c(n) of length $M_{PN}$ is defined by the following equation, where n=0, 1, . . . , $M_{PN-1}$.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$  Equation 2

Herein, $N_C$=1600, the first m-sequence is initialized to $x_1(0)$=1, $x_1(n)$=0, n=1, 2, . . . , 30, and the second m-sequence is denoted by $c_{init}=\Sigma_{i=0}^{30}x_2(i) \cdot 2^i$ which has a value resulting from applying the sequence. In [Equation 1], a pseudo-random sequence generator for generating c(i) is initialized to $c_{init}$ at the beginning of each subframe according to the following equation.

$$c_{init}=(\lfloor n_s/2 \rfloor+1) \cdot (2n_{ID}^{(nSCID)}+1) \cdot 2^{16}+n_{SCID}$$  Equation 3

The quantity $n^{(i)}_{ID}$ i=0, 1) corresponding to $n^{nSCID}_{ID}$ is a physical layer cell ID, $N^{cell}_{ID}$, if no value for a scrambling ID $n^{DMRS,i}_{ID}$ for generation of a UE-RS is provided by a higher layer or if DCI format 1A, 2B or 2C is used for DCI associated with PDSCH transmission, and is $n^{DMRS,i}_{ID}$ otherwise. Unless otherwise specified, $n_{SCID}$ is 0 unless specified otherwise. For a PDSCH transmission on antenna port 7 or 8, $n_{SCID}$ is given by DCI format 2B, 2C or 2D associated with the PDSCH transmission. For DCI format 2B, $n_{SCID}$ is indicated by a scrambling identity field. For DCI format 2B, $n_{SCID}$ is indicated according to the following table.

TABLE 1

| Scrambling identity field in DCI format 2B | $n_{SCID}$ |
| --- | --- |
| 0 | 0 |
| 1 | 1 |

In DCI format 2C or 2D, $n_{SCID}$ is indicated by the following table.

TABLE 2

| One codeword: Codeword 0 enabled, Codeword 1 disabled | | Two codewords: Codeword 0 enabled, Codeword 1 enabled | |
| --- | --- | --- | --- |
| Value | Message | Value | Message |
| 0 | 1 layer, port 7, $n_{SDIC}$ = 0 | 0 | 2 layers, ports 7-8, $n_{SDIC}$ = 0 |
| 1 | 1 layer, port 7, $n_{SDIC}$ = 1 | 1 | 2 layers, ports 7-8, $n_{SDIC}$ = 1 |
| 2 | 1 layer, port 8, $n_{SDIC}$ = 0 | 2 | 3 layers, ports 7-9 |

TABLE 2-continued

| One codeword: Codeword 0 enabled, Codeword 1 disabled | | Two codewords: Codeword 0 enabled, Codeword 1 enabled | |
| --- | --- | --- | --- |
| Value | Message | Value | Message |
| 3 | 1 layer, port 8, $n_{SDIC}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | reserved | 7 | 8 layers, ports 7-14 |

Referring to Equation 1, it may be noted that an RS sequence is generated with respect to the number of REs in a total system band in the LTE/LTE-A system.

Due to the introduction of a plurality of different numerologies, particularly different subcarrier spacings and/or different CP lengths in NR, a new method of mapping a DMRS sequence, that is, a UE-RS sequence to REs is needed.

Figure 19:
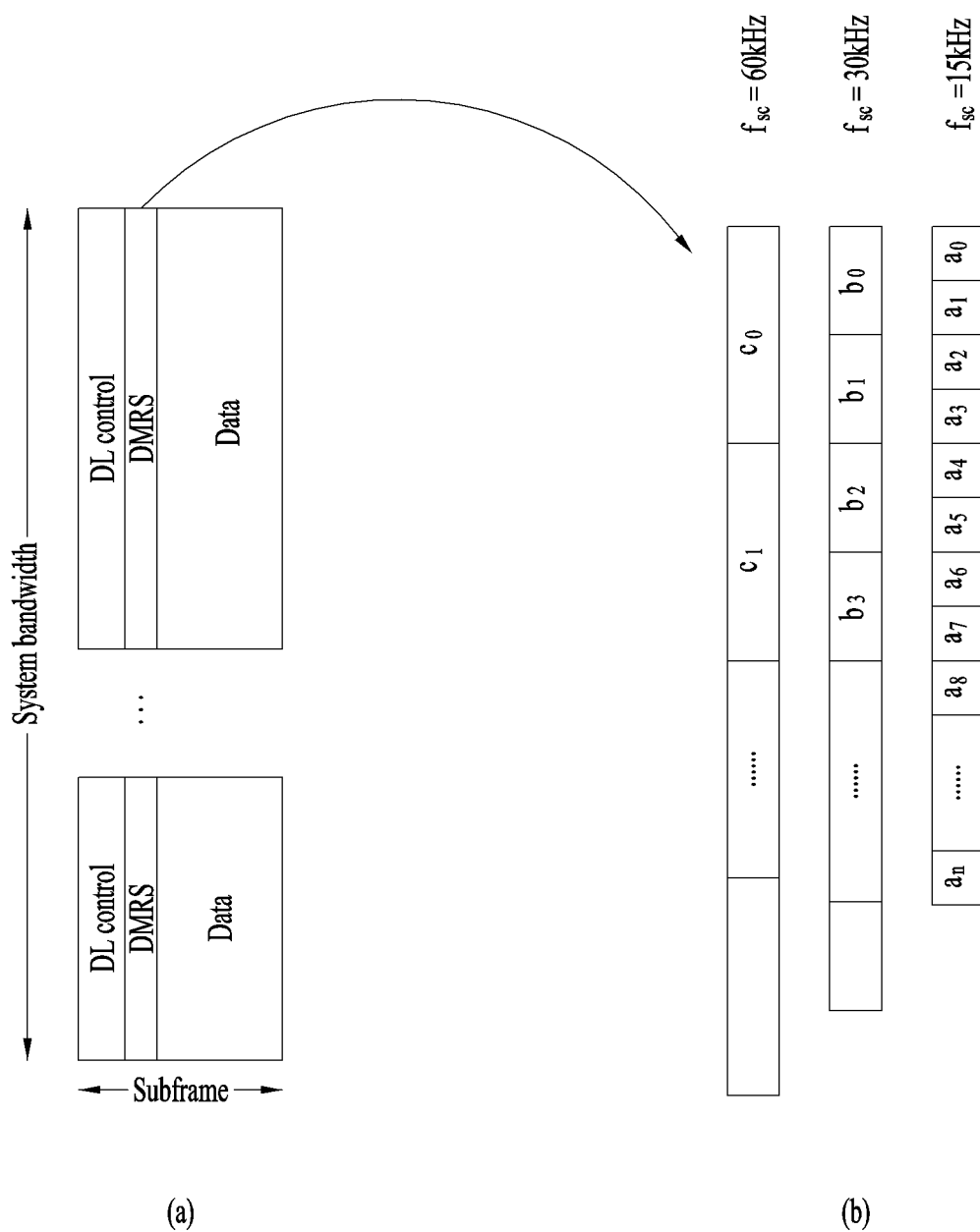
FIG. 19 illustrates examples of mapping a demodulation reference signal (DM-RS) sequence according to the present invention.

FIG. 19 illustrates examples of mapping a DMRS sequence according to the present invention. As illustrated in FIG. 19, a frequency size spanned by one sequence value is changed according to the difference between subcarrier spacings. Therefore, considering different numerologies such as different subcarrier spacings and/or different CP lengths, the following options are available for generating and mapping a DMRS sequence.

>Option a: A DMRS sequence is generated and mapped on a numerology basis. That is, a plurality of sequences are generated for the same system bandwidth. As noted from FIG. 19, there may be a separate DMRS sequence generator for each numerology, and a DMRS sequence may be generated on a numerology basis. According to a frequency area and a numerology scheduled for a specific UE, the UE/TRP may selectively use a sequence value(s) corresponding to the frequency area scheduled for the UE as a DMRS sequence for the UE, from a DMRS sequence for the numerology.

Figure 20:
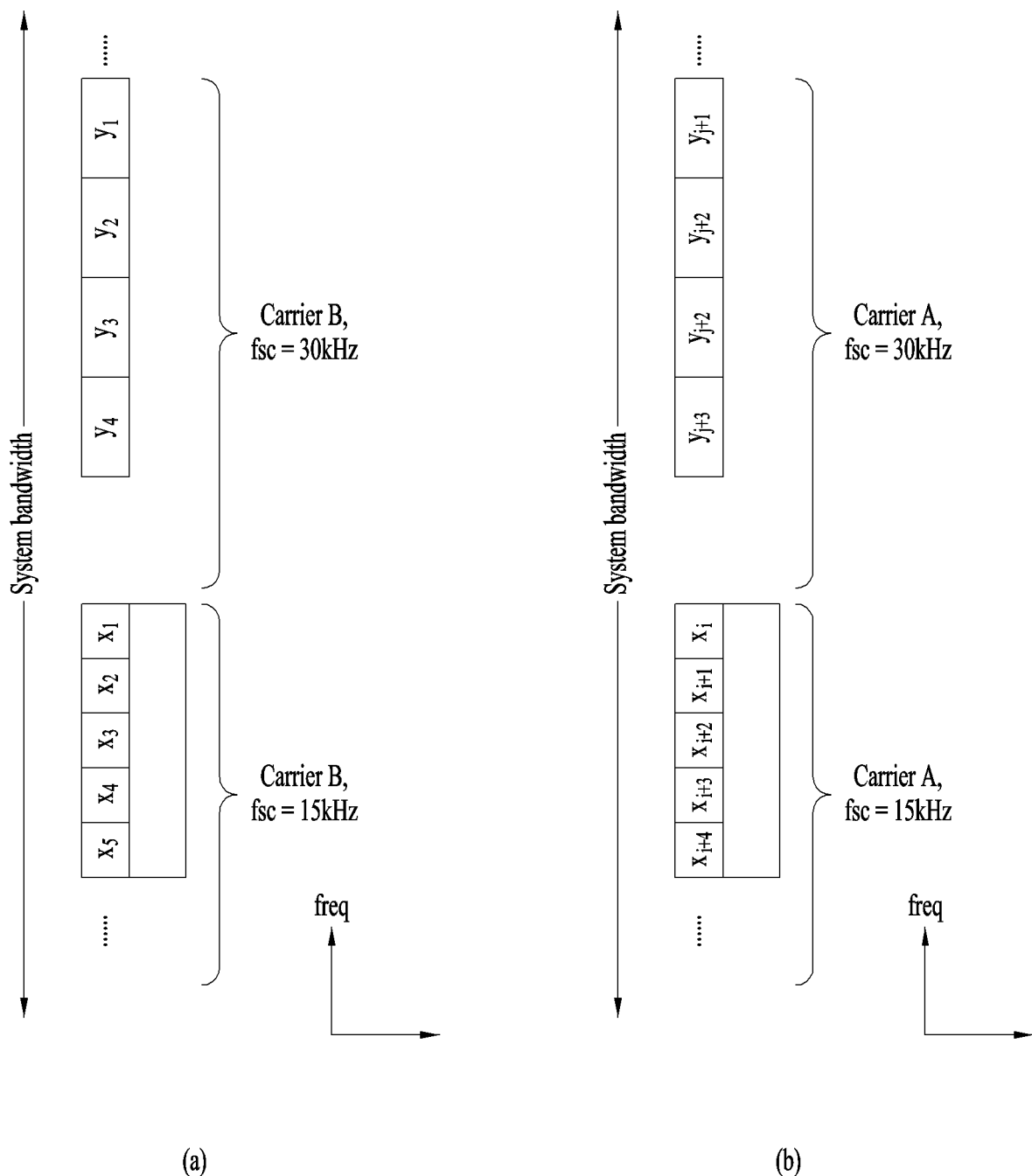
FIG. 20 illustrates other examples of mapping a DM-RS sequence according to the present invention.

>Option b: FIG. 20 illustrates other examples of mapping a DMRS sequence according to the present invention. In FIG. 20, $f_{sc}$ represents a subcarrier spacing. FIG. 20(a) illustrates a method which generates a DMRS sequence for each numerology and then maps the first value of a DMRS sequence from the time when a corresponding numerology starts, irrespective of the frequency positions of corresponding REs within a system band, during DMRS sequence-to-RE mapping in a carrier corresponding to the numerology. The method of FIG. 20(a) may be applied to a case in which a DMRS sequence is mapped on a PRB basis or on an RBG basis, an RBG being a basic unit of scheduling. FIG. 20(b) illustrates a method which generates a DMRS sequence for each numerology and then map sequence values mapped to the frequency positions of corresponding REs from generated DM RS sequence values, in consideration of the frequency positions of the REs in a system band, during DMRS sequence-to-RE mapping in a carrier corresponding to the numerology.

>Option c: A single DMRS sequence is generated and mapped based on a single numerology. A DMRS sequence may be generated and mapped with a default numerology or a smaller subcarrier spacing.

Figure 21:
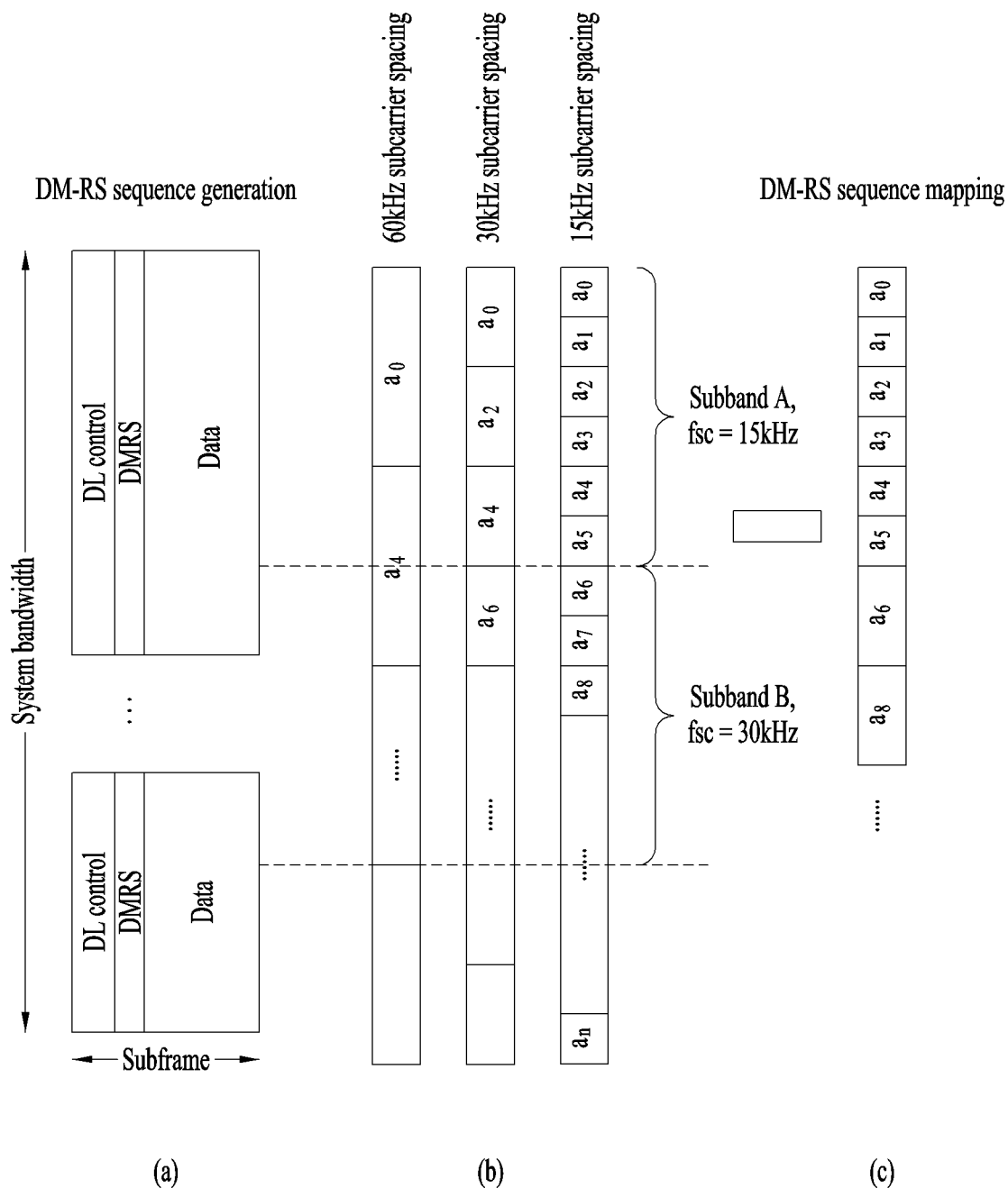
FIG. 21 illustrates another example of a method of generating and mapping a DM-RS sequence.

FIG. 21 illustrates another exemplary method of generating and mapping a DMRS sequence according to the present invention.

Now, a description will be given of a method of using one DMRS sequence irrespective of a UE capability, a service type, and a subcarrier spacing. A sequence is generated based on a default numerology, or a smallest subcarrier spacing supported by the system or considered in designing a DMRS system by the system. Then, for a frequency area scheduled with a relatively large subcarrier spacing, the sequence is decimated by an increased subcarrier spacing ratio, thereby ensuing sequence continuity to a certain extent in a specific system band, even though the subcarrier spacing changes in time or UE-specifically. If sequence continuity can be ensured in spite of the change of a subcarrier spacing along the frequency axis and/or the time axis, interference between neighbor cells may be easily randomized. Further, even when a subcarrier spacing used for transmission of a UE-specific signal is different from a subcarrier spacing for transmission of system information, system information and paging-related signals broadcast by the system are not signals transmitted UE-specifically, and thus the present invention ensuring continuity of a DMRS sequence advantageously allows common derivation of a DMRS sequence for demodulation of a corresponding signal, when a plurality of UEs within a cell are to receive system information in a time/frequency resource area carrying the corresponding signal.

For example, referring to FIG. 21($b$), it is assumed that a DMRS sequence is generated with the subcarrier spacing of 15 kHz, that is, $f_{sc}$=15 kHz. The DMRS sequence should be generated in a length enough to be mapped to the REs of a total band. Then, for the 30-kHz subcarrier spacing, one every two sequence values of a sequence generated with 15-kHz subcarrier spacing is used, thereby obtaining a DMRS sequence covering the total band.

FIG. 21($c$) illustrates an exemplary method of mapping a DMRS sequence, when data is scheduled with the 15-kHz subcarrier spacing and the 30-kHz subcarrier spacing. Basically, let a sequence generated based on a base subcarrier spacing (e.g., a default subcarrier spacing or a smallest subcarrier spacing) be denoted by an (n=0, 1, 2, . . . ,). A DMRS sequence $b_n$ corresponding to a subcarrier spacing K times larger than the base subcarrier spacing may be used. Herein, $b_n=a_{K*n}$ where n=0, 1, 2, . . . . For example, if a DMRS sequence is generated based on the 15-kHz subcarrier spacing, and a DMRS sequence generated for a specific system bandwidth including N subcarriers based on the 15-kHz subcarrier spacing is $a_n$ (n=0, 1, . . . , N−1), a DMRS sequence $b_n$ for the 30-kHz subcarrier spacing is $a_{2n}$ where n=0, 1, 2, . . . , N/2−1, and a DMRS sequence $c_n$ for the 60-kHz subcarrier spacing is $a_{4n}$ where n=0, 1, 2, . . . , N/4−1.

Figure 22:
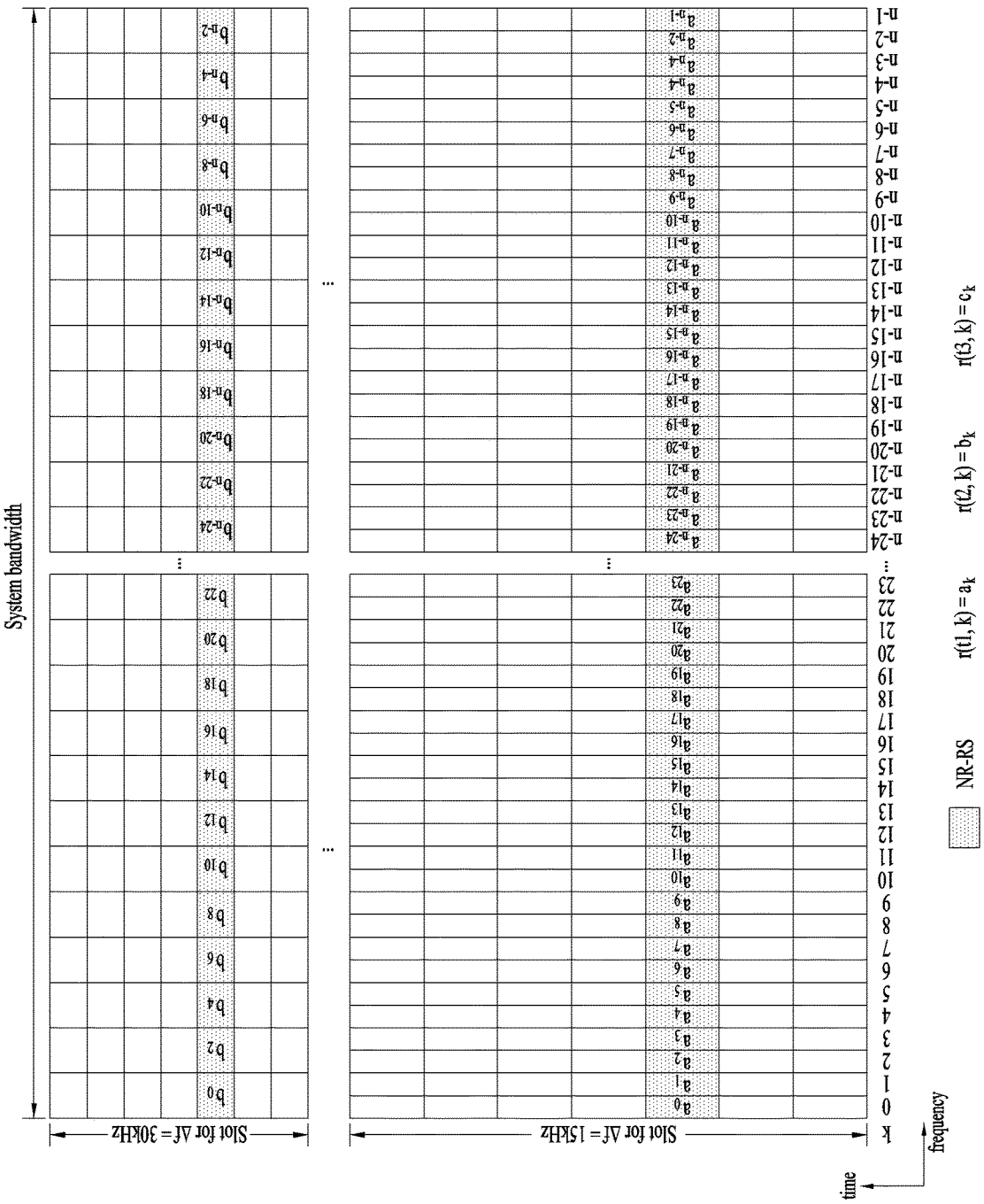
FIGS. 22 and 23 illustrate application examples of the method of generating and mapping a DM-RS sequence illustrated in FIG. 21.
Figure 23:
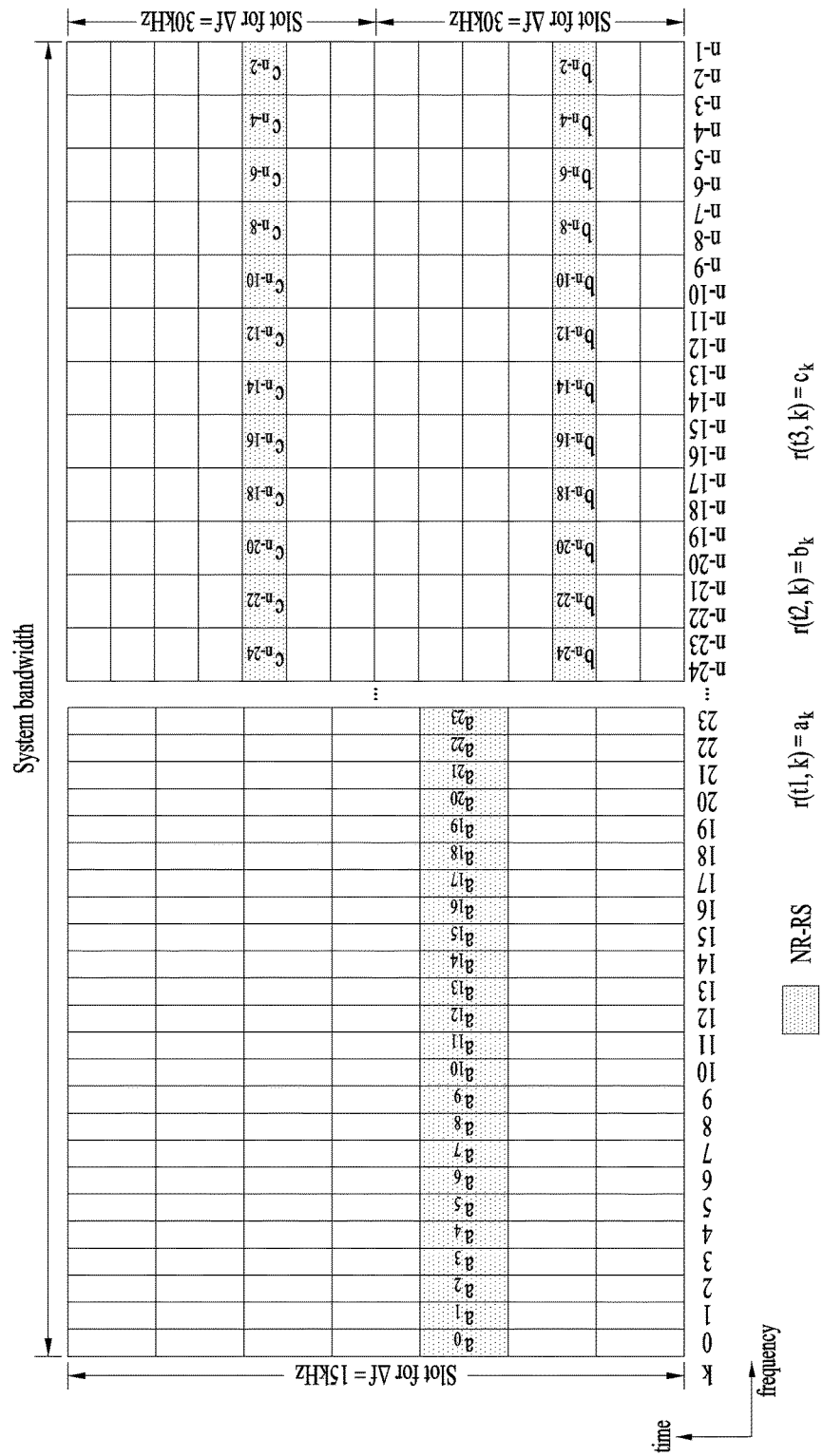

FIGS. 22 and 23 illustrate application examples of the method of generating and mapping a DMRS sequence illustrated in FIG. 21. Particularly, FIG. 22 illustrates an exemplary DMRS sequence for a case in which different subcarrier spacings are used in the same system band with passage of time, and FIG. 23 illustrates an exemplary DMRS sequence for a case in which different subcarrier spacings are used according to frequencies in the same system band. A different DMRS sequence may be used according to a time index (e.g., an OFDM symbol index, a slot index, and/or a radio frame index). That is, for different time indexes, t1, t2 and t3, different DMRS sequences may be generated for the same system bandwidth. Referring to FIG. 22, for a system bandwidth including n subcarriers with the subcarrier spacing of 15 kHz, that is $f_{sc}$=15 kHz, DMRS sequence values $a_0$, $a_1$, $a_2$, $a_3$, $a_4$, . . . , $a_{n-1}$ generated with the 15-kHz subcarrier spacing are used in a slot using the 15-kHz subcarrier spacing, and even-numbered DMRS sequence values $b_0$, $b_2$, $b_4$, $b_6$, . . . or odd-numbered DMRS sequence values $b_1$, $b_3$, $b_5$, $b_7$, . . . among DMRS sequence values $b_0$, $b_1$, $b_2$, $b_3$, $b_4$, . . . , $b_{n-1}$ generated with the 15-kHz subcarrier spacing are used as a DMRS sequence transmitted together with data in a slot using the 30-kHz subcarrier spacing twice larger than the 15-kHz subcarrier spacing. Referring to FIG. 23, for a system bandwidth including n subcarriers with the subcarrier spacing of 15 kHz, that is $f_{sc}$=15 kHz, in a subband which correspond to subcarriers #0 to #23 with $f_{sc}$=15 kHz and use the 15-kHz subcarrier spacing, DMRS sequence values $a_0$, $a_1$, $a_2$, $a_3$, $a_4$, . . . , $a_{23}$ corresponding to the subband from among DMRS sequence values $a_0$, $a_1$, $a_2$, $a_3$, $a_4$, . . . , $a_{n-1}$ generated for a corresponding slot are used as a DMRS sequence. In a subband which uses the 30-kHz subcarrier spacing twice larger than the 15-kHz subcarrier spacing and correspond to subcarriers #24 to #n1 with $f_{sc}$=15 kHz, even-numbered DMRS sequence values $b_{n-24}$, $b_{n-22}$, $b_{n-20}$, $b_{n-18}$, . . . or odd-numbered DMRS sequence values $b_{n-23}$, $b_{n-21}$, $b_{n-19}$, $b_{n-17}$, . . . from among DMRS sequence values $b_{n-24}$, $b_{n-23}$, $b_{n-22}$, $b_{n-21}$, $b_{n-20}$, . . . , $b_{n-1}$ generated for a corresponding slot based on the 15-kHz subcarrier spacing are used as a DMRS sequence to be transmitted together with data.

An eNB transmits downlink data and a DMRS for the downlink data in a frequency band allocated to a specific UE in a total system bandwidth. Herein, the eNB transmits a part corresponding to the frequency band out of a DMRS sequence generated based on a base subcarrier spacing (e.g., a smallest subcarrier spacing), along with the downlink data. Values of the partial DMRS sequence are different according to the actual subcarrier spacing of the frequency band in the corresponding slot, as illustrated in FIGS. 21 to 23. That is, the eNB transmits different DMRS sequence values to the UE according to the position of a frequency band in which the eNB transmits data, and the actual subcarrier spacing of the frequency band in a time slot carrying the data. The UE receives the downlink data and the DMRS for the downlink data in the frequency band allocated to the UE in the total system bandwidth, and demodulates the downlink data based on the DMRS. Herein, the UE uses a part corresponding to the frequency band out of a DMRS sequence based on the base subcarrier spacing (e.g., the minimum subcarrier spacing) for the total system bandwidth in demodulating the downlink data, and the values of the partial DMRS sequence are different according to the actual subcarrier spacing of the frequency band in the corresponding slot, as illustrated in FIGS. 21 to 23. That is, the UE may demodulate the data, assuming that different DMRS sequence values are transmitted according to the position of the frequency band in which the UE has received the data, and the actual subcarrier spacing of the frequency band in the time slot in which the UE has received the data.

In FIGS. 21 to 23, it has been described that DMRS sequence values used for an actual subcarrier spacing K times larger than a base subcarrier spacing are selected every K subcarriers, starting from subcarrier 0 of the base subcarrier spacing, from among DMRS sequence values generated based on the base subcarrier spacing. That is, it has been described with reference to FIGS. 21 to 23 that DMRS sequence values for the subcarrier spacing K times larger than the base subcarrier spacing include $(m*K)^{th}$ (m=0, 1, 2, . . . ) sequence values of the DMRS sequence values generated based on the base subcarrier spacing. However, the starting position of DMRS sequence values for an actual subcarrier spacing may be different from subcarrier #0 of the base subcarrier spacing. For example, the DMRS sequence values may start from subcarrier #x (x is a non-zero positive integer). In this case, every $K^{th}$ value of the DMRS sequence values generated based on the base subcarrier spacing may be selected, starting from subcarrier #x, as the DMRS sequence values for the actual subcarrier spacing K times larger than the base subcarrier spacing. That is, according to the present invention, DMRS sequence values for the actual subcarrier spacing K times larger than the base subcarrier spacing may include $(x+m*K)^{th}$ (m=0, 1, 2, . . . ) sequence values of the DMRS sequence values generated based on the base subcarrier spacing. Herein, x may be one of integers from 0 to K−1.

In another example, if a DMRS sequence is generated according to a default subcarrier spacing, and data is transmitted with a subcarrier spacing smaller than the default subcarrier spacing, a DMRS sequence transmitted together with the data follows the subcarrier spacing of the data. In this case, the DMRS sequence for the data with the subcarrier spacing smaller than the default subcarrier spacing may be a repetition of a part of a DMRS sequence generated based on the default subcarrier spacing. For example, if data is transmitted with the 15-kHz subcarrier spacing in a frequency band in a system in which DMRS sequence values $b_0, b_1, b_2, b_3, b_4, \ldots, b_{n-1}$ are generated based on the 30-kHz subcarrier spacing, a DMRS sequence with the 15-kHz subcarrier spacing for the data transmitted with the 15-kHz subcarrier spacing may be $b_0, b_0, b_1, b_1, b_2, b_2, b_3, b_3, b_4, b_4, \ldots, b_{n-1}$. In other words, if a default subcarrier spacing for generation of a DMRS sequence is k times (k is a positive integer) larger than the subcarrier spacing of an actual data transmission, one subcarrier in the default subcarrier spacing corresponds to subcarrier k in the actual subcarrier spacing. Thus, a DMRS sequence value corresponding to one subcarrier in the default subcarrier spacing is repeated in k subcarriers of the actual subcarrier spacing. If an actual subcarrier spacing is larger than a default subcarrier spacing applied to generation of a DMRS sequence, for example, if the default subcarrier spacing is 30 kHz and the actual subcarrier spacing is 60 kHz, even-numbered or odd-numbered values of the values of a DMRS sequence generated with the subcarrier spacing of 30 kHz may be used.

Figure 24:
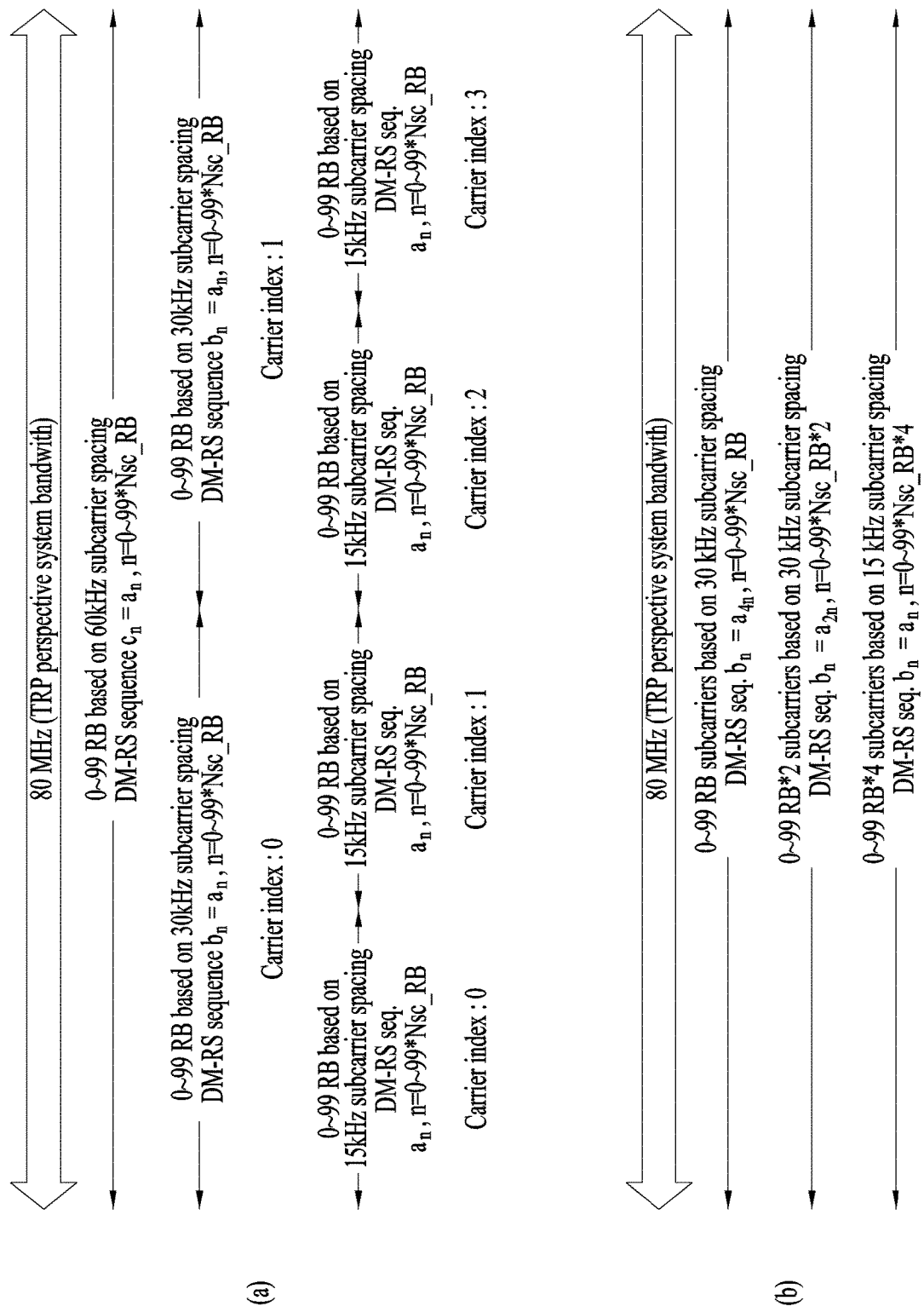
FIG. 24 illustrates a method of generating and mapping a DM-RS sequence in consideration of a maximum system bandwidth supported by a user equipment (UE) or a transmission and reception point (TRP).

FIG. 24 illustrates an exemplary method of generating and mapping a DMRS sequence in consideration of a maximum system bandwidth supported by a UE or a TRP.

A maximum system bandwidth supported by a UE varies with subcarrier spacings, which needs to be considered in generating a DMRS sequence. That is, how much to limit the maximum length of a DMTS sequence due to a limit on the FFT size of the UE needs to be considered. If a maximum system bandwidth supported for any subcarrier spacing by a UE is determined in consideration of the FFT size of the UE, up to Z RBs are available in a system bandwidth supported by the UE, and each RB includes Nsc_RB subcarriers, the maximum length Nmax of a DMRS sequence is limited to Z*Nsc_RB. In this case, for a TRP-perspective system bandwidth, an integer number of DMRS sequences of length Nmax may be used repeatedly.

Referring to FIG. 24(a), on the assumption that the FFT size of a UE is 2048, and each RB includes 12 subcarriers, the UE may support up to 20 MHz for the 15-kHz subcarrier spacing, up to 40 MHz for the 30-kHz subcarrier spacing, and up to 80 MHz for the 60-kHz subcarrier spacing. FIG. 24 illustrates a case in which the maximum number of RBs is limited to, for example, 100 for each of the subcarriers spacings of 15 kHz, 30 kHz, and 60 kHz. In this case, one DMRS sequence an (n=0, . . . , 99) may be repeated every 20 MHz.

Unlike FIG. 24(a), a DMRS sequence is generated for a TRP-perspective system bandwidth, and used according to a frequency position and/or a numerology. That is, as mentioned before, a DMRS sequence of a sufficient length suitable for a TRP-perspective system bandwidth is generated according to one base numerology, and a DMRS sequence obtained by appropriately decimating a part of the values of the DMRS sequence according to a numerology may be used as a DMRS sequence for the numerology.

Figure 25:
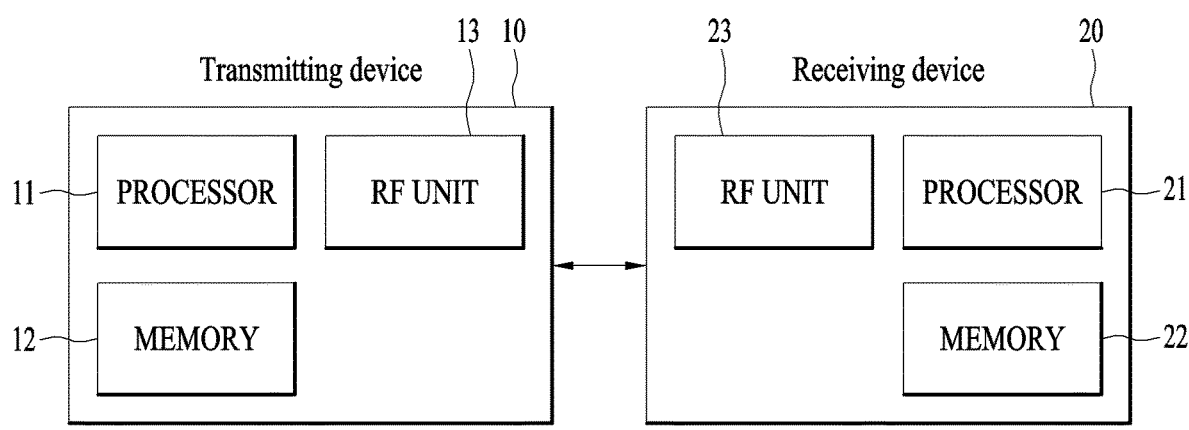
FIG. 25 is a block diagram illustrating elements of a transmitting device 10 and a receiving device 20 for implementing the present invention.

FIG. 25 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor according to the present invention may map data to RBs in any of the methods described in section A.

The eNB processor and the UE processor according to the present invention may perform logical RB indexing and/or physical RB indexing in one of the methods proposed in section B.

The eNB processor and the UE processor according to the present invention may map data to an RB(s) or demap data from an RB(s) according to RB indexing proposed in section B. The eNB processor and the UE processor according to the present invention may generate a DM-RS sequence according to any of the methods proposed in section B, and control the corresponding RF unit to transmit/receive DM-RS sequence values corresponding to the subcarrier spacing of a slot and/or a subband to which data is allocated, together with the data. The processor 21 (e.g., the UE processor) of the receiving device 20, which has received data and a corresponding DM-RS sequence, may demodulate the data based on the DMRS sequence.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

The examples of the present invention are applicable to an eNB, a UE, or other devices in a wireless communication system.

What is claimed is:

1. A method of transmitting a demodulation reference signal (DMRS) by a transmitting device in a wireless communication system, the method comprising:
mapping the DMRS to a frequency resource on a carrier; and
transmitting the DMRS in the frequency resource,
wherein the DMRS is a part of a first sequence subset in a first DMRS sequence x(n), where n=0, 1, 2, 3, . . . , in a state in which the frequency resource has a first subcarrier spacing K1*fsc, where K1 is a positive integer, and fsc is a base subcarrier spacing,
wherein the DMRS is a part of a second sequence subset in a second DMRS sequence y(n), where n=0, 1, 2, 3, . . . , in a state in which the frequency resource has a second subcarrier spacing K2*fsc, where K2 is a positive integer different from K1,
wherein the first sequence subset consists of values allocated to the frequency resource among values of the first DMRS sequence, under an assumption that the first DMRS sequence is allocated in sequence to the carrier along a frequency domain i) based on the first subcarrier spacing K1*fsc and ii) starting with x(0) at a start resource point for the carrier, and
wherein the second sequence subset consists of values allocated to the frequency resource among values of the second DMRS sequence, under an assumption that the second DMRS sequence is allocated in sequence to the carrier along the frequency domain i) based on the second subcarrier spacing K2*fsc and ii) starting with y(0) at the start resource point for the carrier.

2. The method according to claim 1, further comprising:
determining the first DMRS sequence x(n) based on the first subcarrier spacing K1*fsc; and
determining the second DMRS sequence y(n) based on the second subcarrier spacing K2*fsc.

3. The method according to claim 1,
wherein the frequency resource is a part of a system bandwidth of the carrier.

4. The method according to claim 1,
wherein the base subcarrier spacing is the smallest one among a plurality of subcarrier spacings supported by the wireless communication system.

5. The method according to claim 1,
wherein the base subcarrier spacing is 15 kHz.

6. An apparatus comprising:
at least one processor; and
at least one memory connectable to the at least one processor and storing at least one program that, when executed, causes the at least one processor to performs operations comprising:
mapping a demodulation reference signal (DMRS) to a frequency resource on a carrier; and
transmitting the DMRS in the frequency resource,
wherein the DMRS is a part of a first sequence subset in a first DMRS sequence x(n), where n=0, 1, 2, 3, . . . , in a state in which the frequency resource has a first subcarrier spacing K1*fsc, where K1 is a positive integer, and fsc is a base subcarrier spacing, wherein the DMRS is a part of a second sequence subset in a second DMRS sequence y(n), where n=0, 1, 2, 3, . . . , in a state in which the frequency resource has a second subcarrier spacing K2*fsc, where K2 is a positive integer different from K1, wherein the first sequence subset consists of values allocated to the frequency resource among values of the first DMRS sequence, under an assumption that the first DMRS sequence is allocated in sequence to the carrier along a frequency domain i) based on the first subcarrier spacing K1*fsc and ii) starting with x(0) at a start resource point for the carrier, and wherein the second sequence subset consists of values allocated to the frequency resource among values of the second DMRS sequence, under an assumption that the second DMRS sequence is allocated in sequence to the carrier along the frequency domain based on the second subcarrier spacing K2*fsc and ii) starting with y(0) at the start resource point for the carrier.

7. The apparatus according to claim 6, wherein the operations further comprise:
determining the first DMRS sequence x(n) based on the first subcarrier spacing K1*fsc; and
determining the second DMRS sequence y(n) based on the second subcarrier spacing K2*fsc.

8. The apparatus according to claim 6,
wherein the frequency resource is a part of a system bandwidth of the carrier.

9. The apparatus according to claim 6,
wherein the base subcarrier spacing is the smallest one among a plurality of subcarrier spacings supported by a wireless communication system.

10. The apparatus according to claim 6,
wherein the base subcarrier spacing is 15 kHz.

11. A method of transmitting a demodulation reference signal (DMRS) by a transmitting device in a wireless communication system, the method comprising:
mapping a first DMRS to a first frequency resource on a carrier;
transmitting the first DMRS in the first frequency resource;
mapping a second DMRS to a second frequency resource on the carrier; and
transmitting the second DMRS in the second frequency resource,
wherein the first frequency resource has a first subcarrier spacing K1*fsc, and the second frequency resource has a second subcarrier spacing K2*fsc, where K1 and K2 are different positive integers, and fsc is a base subcarrier spacing,
wherein the first DMRS is a part of a first sequence subset in a first DMRS sequence x(n), where n=0, 1, 2, 3, . . . ,
wherein the second DMRS is a part of a second sequence subset in a second DMRS sequence y(n), where n=0, 1, 2, 3, . . . ,
wherein the first sequence subset consists of values allocated to the first frequency resource among values of the first DMRS sequence among values of the first DMRS sequence, under an assumption that the first DMRS sequence is allocated in sequence to the carrier along a frequency domain i) based on the first subcarrier spacing K1*fsc and ii) starting with x(0) at a start resource point for the carrier, and wherein the second sequence subset consists of values allocated to the second frequency resource among values of the second DMRS sequence, under an assumption that the first DMRS sequence allocated in sequence to the carrier along the frequency domain i) based on the second subcarrier spacing K2*fsc and ii) starting with y(0) at the start resource point for the carrier.

12. The method according to claim 11, further comprising:
determining the first DMRS sequence x(n) based on the first subcarrier spacing K1*fsc; and
determining the second DMRS sequence y(n) based on the second subcarrier spacing K2*fsc.

13. The method according to claim 11,
wherein the first frequency resource belong to a first subband of the carrier, and the second frequency resource belongs to a second subband of the carrier different from the first subband.

14. The method according to claim 11,
wherein the base subcarrier spacing is the smallest one among a plurality of subcarrier spacings supported by the wireless communication system.

15. The method according to claim 11,
wherein the base subcarrier spacing is 15 kHz.

16. An apparatus comprising:
at least one processor; and
at least one memory connectable to the at least one processor and storing at least one program that, when executed, causes the at least one processor to performs operations comprising:
mapping a first demodulation reference signal (DMRS) to a first frequency resource on a carrier;
transmitting the first DMRS in the first frequency resource;
mapping a second DMRS to a second frequency resource on the carrier; and
transmitting the second DMRS in the second frequency resource,
wherein the first frequency resource has a first subcarrier spacing K1*fsc, and the second frequency resource has a second subcarrier spacing K2*fsc, where K1 and K2 are different positive integers, and fsc is a base subcarrier spacing,
wherein the first DMRS is a part of a first sequence subset in a first DMRS sequence x(n), where n=0, 1, 2, 3, . . . ,
wherein the second DMRS is a part of a second sequence subset in a second DMRS sequence y(n), where n=0, 1, 2, 3, . . . ,
wherein the first sequence subset consists of values allocated to the first frequency resource among values of the first DMRS sequence among values of the first DMRS sequence, under an assumption that the first DMRS sequence is allocated in sequence to the carrier along a frequency domain i) based on the first subcarrier spacing K1*fsc and ii) starting with x(0) at a start resource point for the carrier, and wherein the second sequence subset consists of values allocated to the second frequency resource among values of the second DMRS sequence, under an assumption that the first DMRS sequence allocated in sequence to the carrier along the frequency domain i) based on the second subcarrier spacing K2*fsc and ii) starting with y(0) at the start resource point for the carrier.

17. The apparatus according to claim 16, further comprising:
   determining the first DMRS sequence x(n) based on the first subcarrier spacing K1*fsc; and
   determining the second DMRS sequence y(n) based on the second subcarrier spacing K2*fsc.

18. The apparatus according to claim 16,
   wherein the first frequency resource belong to a first subband of the carrier, and the second frequency resource belongs to a second subband of the carrier different from the first subband.

19. The apparatus according to claim 16,
   wherein the base subcarrier spacing is the smallest one among a plurality of subcarrier spacings supported by a wireless communication system.

20. The apparatus according to claim 16,
   wherein the base subcarrier spacing is 15 kHz.

\* \* \* \* \*